United States Patent
Woo et al.

(10) Patent No.: US 11,924,787 B2
(45) Date of Patent: Mar. 5, 2024

(54) ELECTRONIC DEVICE FOR PERFORMING BEAMFORMING-BASED COMMUNICATION, AND METHOD THEREFOR

(71) Applicant: Samsung Electronics Co., Ltd., Suwon-si (KR)

(72) Inventors: Junyoung Woo, Suwon-si (KR); Youngpo Lee, Suwon-si (KR); Hyoungjoo Lee, Suwon-si (KR); Chaiman Lim, Suwon-si (KR); Euichang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 17/418,522

(22) PCT Filed: Dec. 12, 2019

(86) PCT No.: PCT/KR2019/017570
§ 371 (c)(1),
(2) Date: Jun. 25, 2021

(87) PCT Pub. No.: WO2020/141753
PCT Pub. Date: Jul. 9, 2020

(65) Prior Publication Data
US 2022/0070800 A1    Mar. 3, 2022

(30) Foreign Application Priority Data
Dec. 31, 2018    (KR) .................... 10-2018-0173439

(51) Int. Cl.
*H04W 56/00* (2009.01)
*H04B 7/06* (2006.01)
*H04B 7/08* (2006.01)

(52) U.S. Cl.
CPC ........ *H04W 56/001* (2013.01); *H04B 7/0695* (2013.01); *H04B 7/088* (2013.01); *H04B 7/0897* (2013.01)

(58) Field of Classification Search
CPC ... H04W 56/001; H04B 7/0897; H04B 7/088; H04B 7/0695
See application file for complete search history.

(56) References Cited

U.S. PATENT DOCUMENTS 9,048,894 B2    6/2015    Wang et al.
9,225,401 B2    12/2015    Wang
(Continued)

FOREIGN PATENT DOCUMENTS

KR    10-2017-0044645 A    4/2017
KR    10-2018-0089371 A    8/2018
(Continued)

OTHER PUBLICATIONS

5G/NR-SS Block, Sep. 22, 2018, https://www.sharetechnote.com/html/5G/5G_SS_Block.html.
(Continued)

*Primary Examiner* — Derrick V Rose
(74) *Attorney, Agent, or Firm* — Jefferson IP Law, LLP

(57) ABSTRACT

An electronic device includes a housing, at least one antenna array disposed in the housing or formed on a part of the housing and including a plurality of antenna elements, a processor electrically or operatively connected to the antenna array, and a memory operatively connected to the at least one processor. In addition to the above, various embodiments identified through the specification are possible.

15 Claims, 16 Drawing Sheets

(56) References Cited

U.S. PATENT DOCUMENTS

| | | |
|---|---|---|
| 9,246,571 B2 | 1/2016 | Wang et al. |
| 9,344,165 B2 | 5/2016 | Wang |
| 9,491,755 B2 | 11/2016 | Abu-Surra et al. |
| 9,564,957 B2 | 2/2017 | Balraj et al. |
| 9,749,935 B2 | 8/2017 | Li et al. |
| 10,218,478 B2 | 2/2019 | Kim et al. |
| 10,440,672 B2 | 10/2019 | Ko et al. |
| 11,070,276 B2 | 7/2021 | Bolin et al. |
| 2006/0209876 A1* | 9/2006 | Liu ............... H04B 7/0695 370/352 |
| 2013/0235851 A1 | 9/2013 | Abu-Surra et al. |
| 2013/0237218 A1 | 9/2013 | Li et al. |
| 2015/0244447 A1 | 8/2015 | Wang et al. |
| 2016/0191131 A1 | 6/2016 | Balraj et al. |
| 2018/0219289 A1* | 8/2018 | Sherlock ............. H01Q 21/065 |
| 2018/0279387 A1 | 9/2018 | Hui et al. |
| 2018/0343629 A1 | 11/2018 | Choi et al. |
| 2019/0045377 A1 | 2/2019 | Kakishima et al. |
| 2019/0200306 A1 | 6/2019 | Ko et al. |
| 2020/0008164 A1 | 1/2020 | Ko et al. |
| 2020/0274605 A1* | 8/2020 | Nilsson ............. H04B 7/0695 |

FOREIGN PATENT DOCUMENTS

| | | |
|---|---|---|
| KR | 10-2018-0101339 A | 9/2018 |
| KR | 10-2018-0109048 A | 10/2018 |
| WO | 2017/136732 A1 | 8/2017 |
| WO | 2018/146198 A1 | 8/2018 |

OTHER PUBLICATIONS

Korean Office Action dated Jan. 3, 2024, issued in Korean Application No. KR 10-2018-0173439.

* cited by examiner

ELECTRONIC DEVICE FOR PERFORMING BEAMFORMING-BASED COMMUNICATION, AND METHOD THEREFOR

TECHNICAL FIELD

Embodiments disclosed in the present disclosure relate to an electronic device performing communication based on beamforming and a method therefor.

BACKGROUND ART

Electronic devices may support cellular communication. For cellular communication, for example, a wireless protocol according to a communication standard standardized by a 3rd generation partnership project (3GPP) may be used. With the development of communication standards, the range of frequency bands that may be used by electronic devices is increasing. For example, in the 5th generation mobile communication, electronic devices may increase the data rate by using mmWave (e.g., a signal in a frequency band of 6 GHz or higher).

In 5G mobile communication, a base station may include an array antenna. The base station may generate a plurality of beams directed in different directions in a horizontal and/or vertical direction using the array antenna. Unlike 4G mobile communication, a user device supporting 5G mobile communication may use a beamforming technology in order to transmit or receive signals. Since a transmitting end and a receiving end support beamforming, the user device may determine a combination (or beam pair) of the beam of the base station and the beam of the user equipment that exhibit optimal link performance. For example, the user device may determine a combination of beams through a beam tracking procedure.

DISCLOSURE OF THE INVENTION

Technical Problem

In the 5th generation mobile communication, the base station may transmit a series of synchronization signal blocks. For example, the base station may transmit a series of synchronization signal blocks during a specified period. For example, each of the series of synchronization signal blocks may correspond to different transmit beams. For example, the base station may transmit one or more synchronization signal blocks at a specified period. For example, the transmission of synchronization signal blocks through a plurality of transmit beams based on a specified period may be referred to as beam sweeping.

The electronic device may receive a series of synchronization signal blocks from the base station by using a different receive beam for each beam sweeping in order to determine a beam pair between the transmit beam of the base station and the receive beam of the electronic device. For example, the electronic device may receive a plurality of synchronization signal blocks by using a receive beam formed by adjusting a phase associated with each of the plurality of antenna elements. For example, the electronic device may perform a beam pair search for not only its serving cell but also neighbor cells.

For example, the electronic device may transition to an active or wakeup state in order to receive a series of synchronization signal blocks at a specified period in radio resource control (RRC) idle or inactive state. An active or wakeup state time of an electronic device may increase due to an increase in time for determining the beam pair. Accordingly, power consumption of the electronic device may increase.

Technical Solution

According to an aspect of the present disclosure, there is provided an electronic device including: a housing, at least one antenna array disposed in the housing or formed on a part of the housing and including a plurality of antenna elements, a processor electrically or operatively connected to the antenna array, and a memory operatively connected to the at least one processor. The memory may store instructions that, when executed, cause the at least one processor to form an omni-directional receive beam (Rx beam) by using at least one of the plurality of antenna elements, receive a plurality of synchronization signal blocks (SSBs) corresponding to a plurality of transmit beams (Tx beams) transmitted from at least one base station, respectively, through the plurality of Tx beams by using the omni-directional Rx beam, and select at least one of the plurality of Tx beams based at least in part on the reception result.

According to another aspect of the present disclosure, there is provided an electronic device including a memory, an antenna array including a plurality of conductive plates, and a processor operatively connected to the memory and the antenna array. The processor may be configured to receive a plurality of synchronization signal blocks corresponding to a plurality of transmit beams from a base station by using at least one first receive beam formed using one of the plurality of conductive plates, identify at least one of the plurality of synchronization signal blocks received by using the first receive beam based at least in part on reception strengths of the plurality of synchronization signal blocks, receive the at least one identified synchronization signal block by using each of a plurality of second receive beams formed using the plurality of conductive plates, and determine one synchronization signal block among the at least one identified synchronization signal block based at least in part on a reception strength of at least one synchronization signal block received by using each of the plurality of second receive beams.

According to another aspect of the present disclosure, there is provided a method for receiving a synchronization signal of an electronic device including: receiving a plurality of synchronization signal blocks corresponding to a plurality of transmit beams from a base station by using a first receive beam formed using one of a plurality of conductive plates of an antenna array of the electronic device, identifying at least one of the plurality of synchronization signal blocks received by using the first receive beam based at least on reception strengths of the plurality of synchronization signal blocks, receiving the at least one identified synchronization signal block by using each of a plurality of second receive beams formed using the plurality of conductive plates, and determining one synchronization signal block among the at least one identified synchronization signal block based at least on a reception strength of at least one synchronization signal block received using each of the plurality of second receive beams.

Advantageous Effects

According to various embodiments disclosed in the present disclosure, the electronic device may reduce power consumption for determining a beam pair.

Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, various embodiments disclosed in the present disclosure will be described with reference to the accompanying drawings. It should be appreciated that embodiments and the terms used therein are not intended to limit the technologies set forth herein to particular embodiments and include various changes, equivalents, and/or replacements for a corresponding embodiment.

Figure 1:
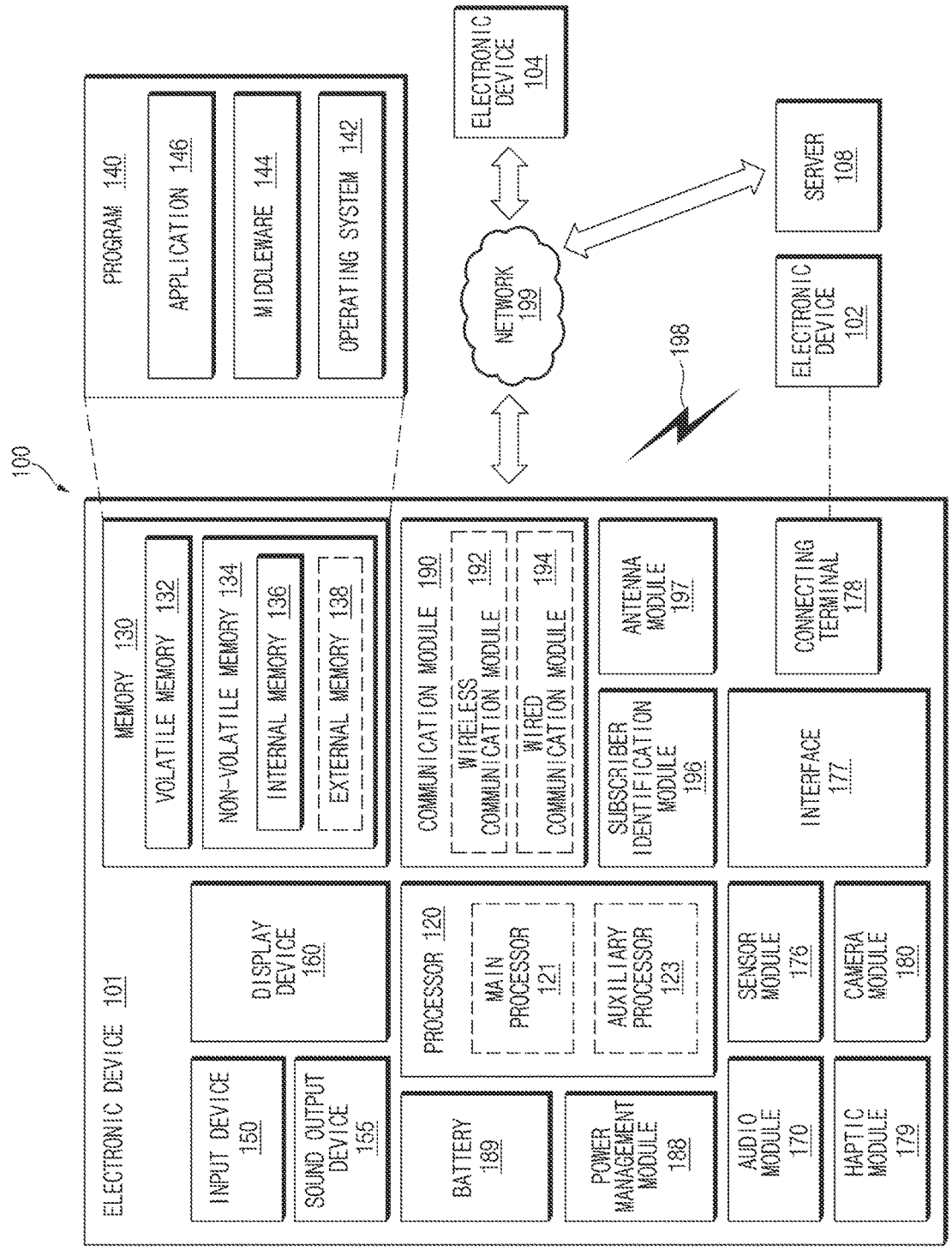
FIG. 1 illustrates a block diagram of an electronic device in a network according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
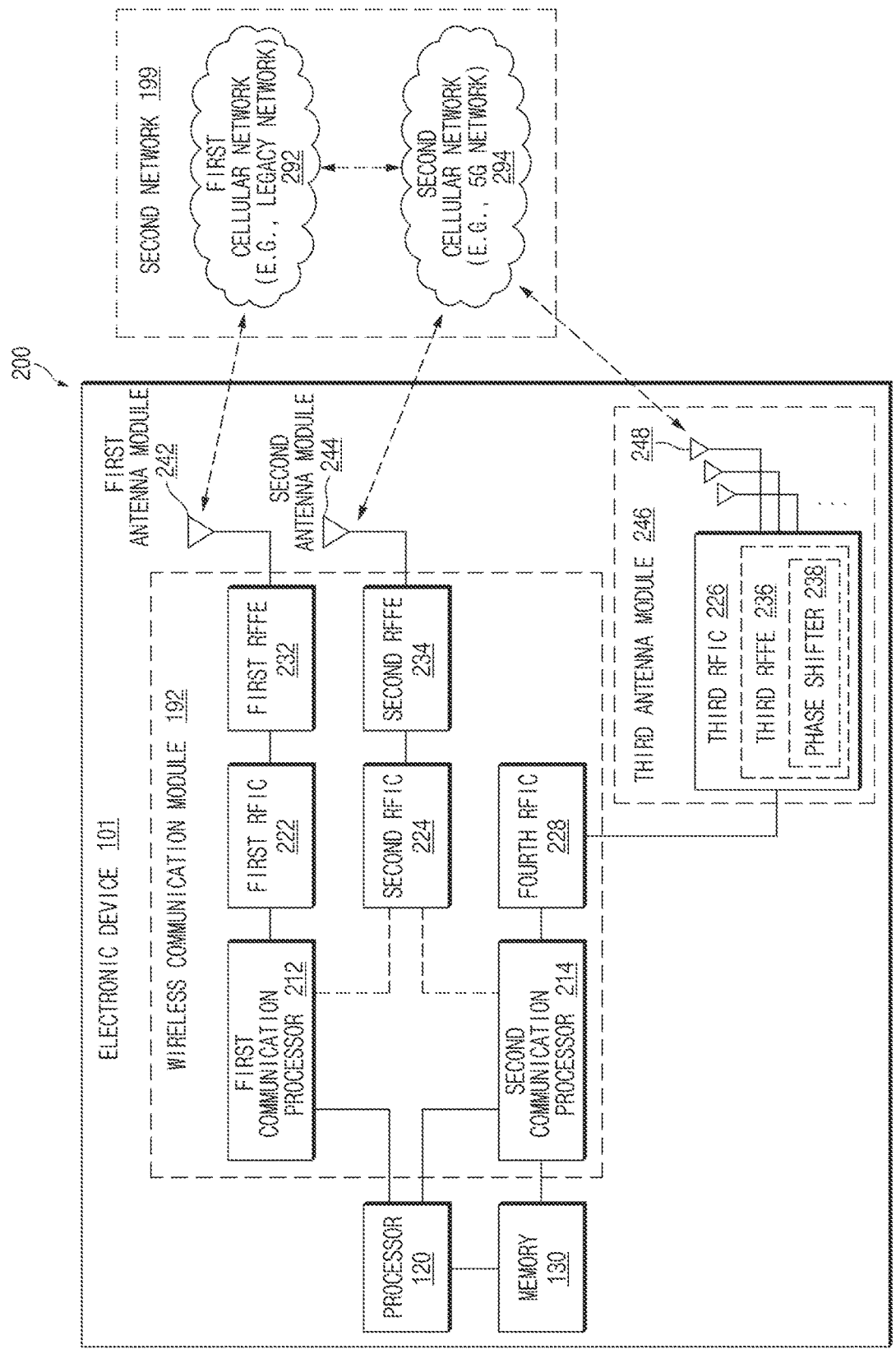
FIG. 2 is a block diagram of an electronic device in a network environment including a plurality of cellular networks according to various embodiments.

FIG. 2 is a block diagram 200 of the electronic device 101 in a network environment including a plurality of cellular networks according to various embodiments. Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna (248). The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or included as a part of the third RFIC 226.

The first communication processor 212 may support the establishment of a communication channel of a band to be used for wireless communication with the first cellular network 292 and legacy network communication through the established communication channel According to various embodiments, the first cellular network may be a legacy network including a 2nd generation (2G), 3G, 4G, or long-term evolution (LTE) network. The second communication processor 214 may support the establishment of a communication channel corresponding to a specified band (e.g., approximately 6 GHz to 60 GHz) in bands to be used for wireless communication with the second cellular network 294 and 5G network communication through the established communication channel According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) in bands to be used for wireless communication with the second cellular network 294 and 5G network communication through the established communication channel According to an embodiment, the first communication processor 212 and the second communication processor 214 may be implemented in a single chip or a single package. According to various embodiments, the first communication processor 212 or the second communication processor 214 may be formed with the processor 120, the coprocessor 123, or the communication module 190 in a single chip or a single package. According to an embodiment, the first communication processor 212 and the second communication processor 214 are directly or indirectly connected to each other by an interface (not illustrated) to provide or receive data or control signals in either or both directions.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. The third RFIC 226 may convert the preprocessed 5G Above6 RF signal into a baseband signal so as to be processed by the second communication processor 214. According to an embodiment, the third RFFE 236 may be formed as part of the third RFIC 226.

The electronic device 101 may include the fourth RFIC 228 separately from or at least as a part of the third RFIC 226 according to an embodiment. In this case, the fourth RFIC 228 may convert the baseband signal generated by the second communication processor 214 into an RF signal (hereinafter, referred to as an IF signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

According to an embodiment, the antenna 248 may be formed as an antenna array including a plurality of antenna elements that may be used for beamforming. In this case, the third RFIC 226 may include, for example, a plurality of phase shifters 238 corresponding to a plurality of antenna elements as part of the third RFFE 236. Upon transmission, each of the plurality of phase shifters 238 may shift the phase of the 5G Above6 RF signal to be transmitted to the outside of the electronic device 101 (e.g., the base station of the 5G network) through a corresponding antenna element. Upon reception, each of the plurality of phase shifters 238 may shift the phase of the 5G Above6 RF signal received from the outside into the same or substantially the same phase through a corresponding antenna element. This enables transmission or reception through beamforming between the electronic device 101 and the outside.

The second cellular network 294 (e.g., the 5G network) may be operated independently from (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
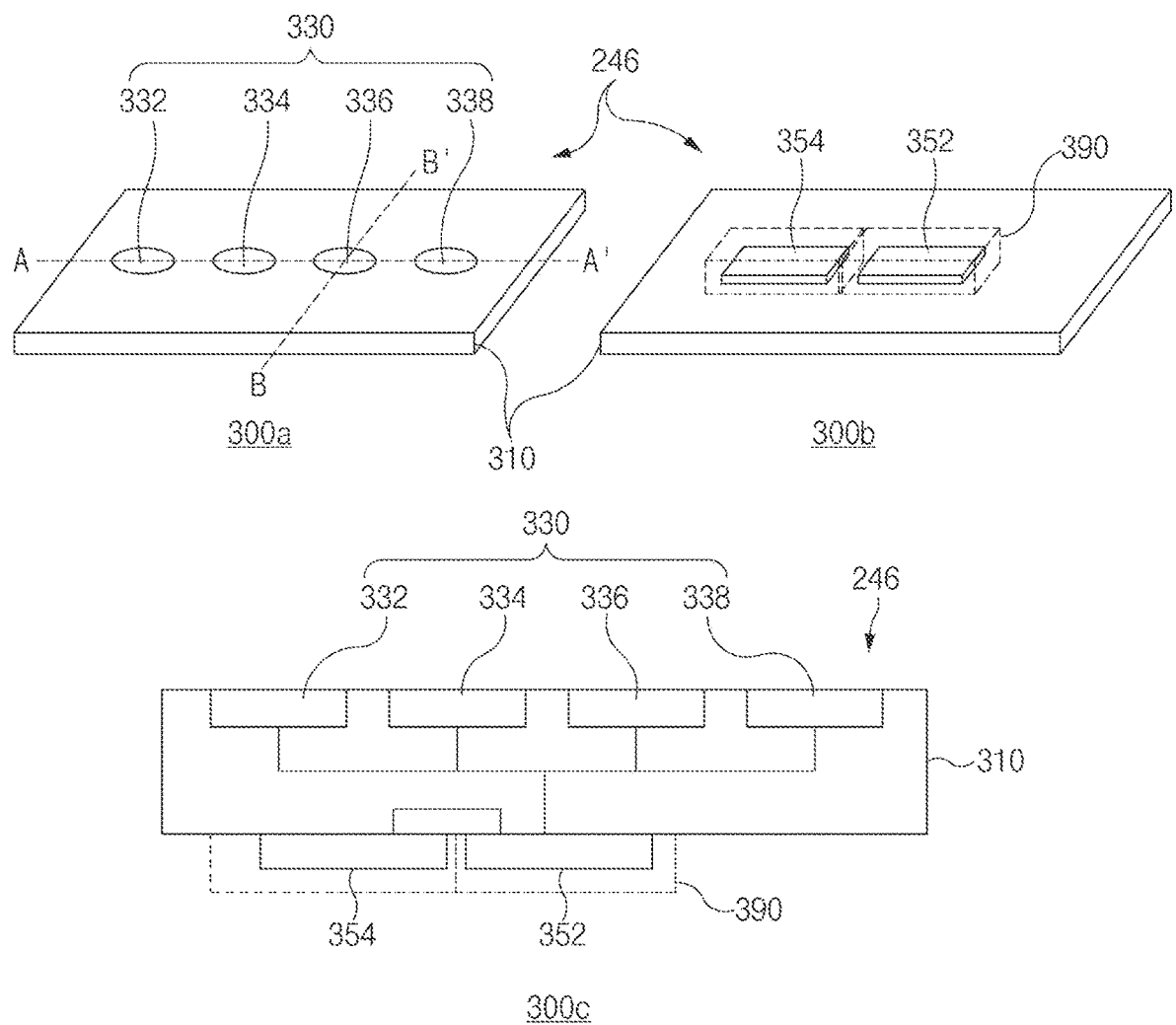
FIG. 3 illustrates an embodiment of a structure of a third antenna module.

FIG. 3 illustrates an embodiment of a structure of the third antenna module 246 described with reference to FIG. 2, for example. 300a of FIG. 3 is a perspective view of the third antenna module 246 viewed from one side, and 300b of FIG. 3 is a perspective view of the third antenna module 246 viewed from the other side. 300c of FIG. 3 is a cross-sectional view of A-A' of the third antenna module 246.

Referring to FIG. 3, in an embodiment, the third antenna module 246 may include a printed circuit board 310, an antenna array 330, a radio frequency integrated circuit (RFIC) 352, and a power manage integrated circuit (PMIC) 354, and a module interface 370. The third antenna module 246 may further optionally include a shielding member 390. In other embodiments, at least one of the aforementioned parts may be omitted, or at least two of the parts may be integrally formed.

The printed circuit board 310 may include a plurality of conductive layers and a plurality of non-conductive layers alternately stacked with the conductive layers. The printed circuit board 310 may provide an electrical connection between the printed circuit board 310 and/or various electronic components disposed outside by using wires and conductive vias formed on the conductive layer.

The antenna array 330 (e.g., 248 in FIG. 2) may include a plurality of antenna elements 332, 334, 336, and 338 arranged to form a directional beam. The antenna elements may be formed on a first surface of the printed circuit board 310 as illustrated. According to another embodiment, the antenna array 330 may be formed inside the printed circuit board 310. According to embodiments, the antenna array 330 may include a plurality of antenna arrays (e.g., a dipole antenna array and/or a patch antenna array) of the same or different shape or type.

The RFIC 352 (e.g., 226 in FIG. 2) may be disposed in another region of the printed circuit board 310 (e.g., a second surface opposite to the first surface), spaced apart from the antenna array. The RFIC is configured to process a signal of a selected frequency band transmitted and received via the antenna array 330. According to an embodiment, upon transmission, the RFIC 352 may convert a baseband signal obtained from a communication processor (not illustrated) into an RF signal of a specified band. Upon reception, the RFIC 352 may convert an RF signal received via the antenna array 352 into a baseband signal and transmit the converted signal to the communication processor.

According to another embodiment, upon transmission, the RFIC 352 may up-convert an IF signal (e.g., approximately 9 GHz to approximately 11 GHz) obtained from an intermediate frequency integrated circuit (IFIC) (e.g., 228 in FIG. 2) into the RF signal of the selected band. Upon reception, the RFIC 352 may down-convert the RF signal obtained via the antenna array 352 into an IF signal, and transmit the converted signal to the IFIC.

The PMIC 354 may be disposed in another partial region (e.g., the second surface) of the printed circuit board 310, spaced apart from the antenna array. The PMIC may receive a voltage from a main PCB (not shown) and provide the power required for various components (e.g., RFIC 352) on antenna modules.

The shielding member 390 may be disposed on a part (e.g., the second surface) of the printed circuit board 310 in order to electromagnetically shield at least one of the RFIC 352 and the PMIC 354. According to an embodiment, the shielding member 390 may include a shield can.

Although not shown, in various embodiments, the third antenna module 246 may be electrically connected to another printed circuit board (e.g., the main circuit board) through the module interface. The module interface may include a connection member, for example, a coaxial cable connector, a board to board connector, an interposer, or a flexible printed circuit board (FPCB). Using the connection member, the RFIC 352 and/or the PMIC 354 of the antenna module may be electrically connected to the printed circuit board.

Figure 4:
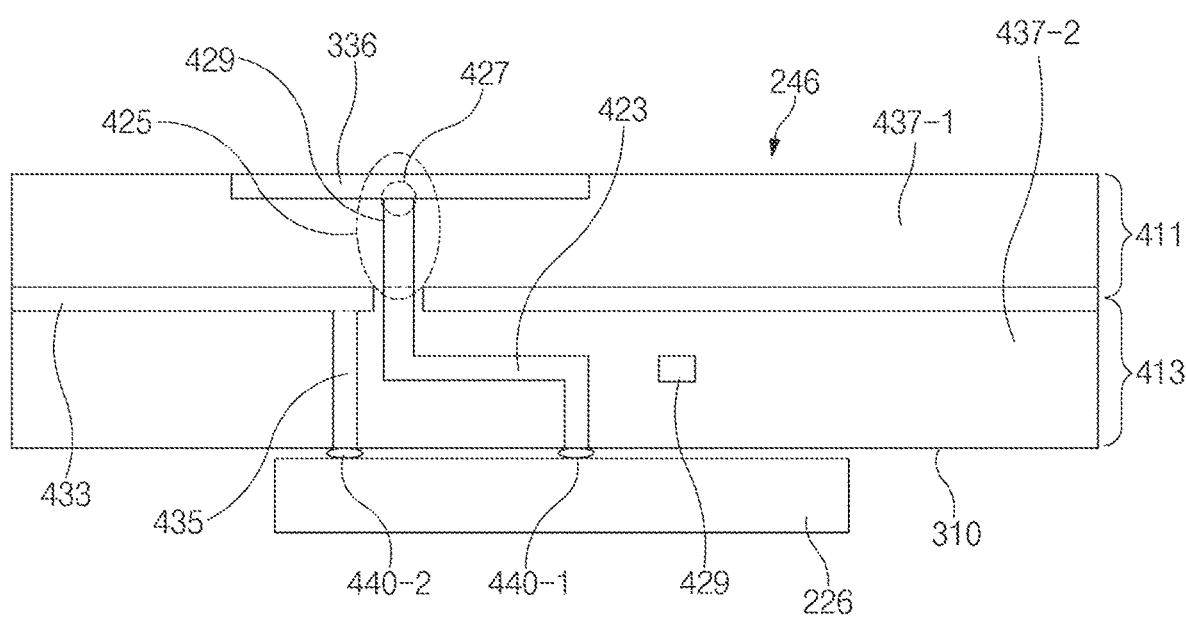
FIG. 4 illustrates a cross-sectional view of a third antenna module.

FIG. 4 illustrates a cross-section taken along line B-B' of the third antenna module 246 of 300a of FIG. 3. The printed circuit board 310 of the illustrated embodiment may include an antenna layer 411 and a network layer 413.

The antenna layer 411 may include at least one dielectric layer 437-1, and an antenna element 336 and/or a feeding unit 425 formed on the outer surface of or inside of the dielectric layer. The feeding unit 425 may include a feeding point 427 and/or a feeding line 429.

The network layer 413 may include at least one dielectric layer 437-2, at least one ground layer 433 formed on the outer surface of or inside of the dielectric layer, at least one conductive via 435, a transmission line 423, and/or a signal line 429.

In addition, in the illustrated embodiment, the third RFIC 226 of 300c of FIG. 3 may be electrically connected to the network layer 413, for example, through first and second connecting portions (solder bumps) 440-1 and 440-2. In other embodiments, various connecting structures (e.g., solder or BGA) may be used instead of the connecting portions. The third RFIC 226 may be electrically connected to the antenna element 336 via a first connecting portion 440-1, the transmission line 423, and the feeding unit 425. The third RFIC 226 may also be electrically connected to the ground layer 433 via the second connecting portion 440-2 and the conductive via 435. Although not illustrated, the third RFIC 226 may also be electrically connected to the module interface mentioned above via the signal line 429.

Figure 5:
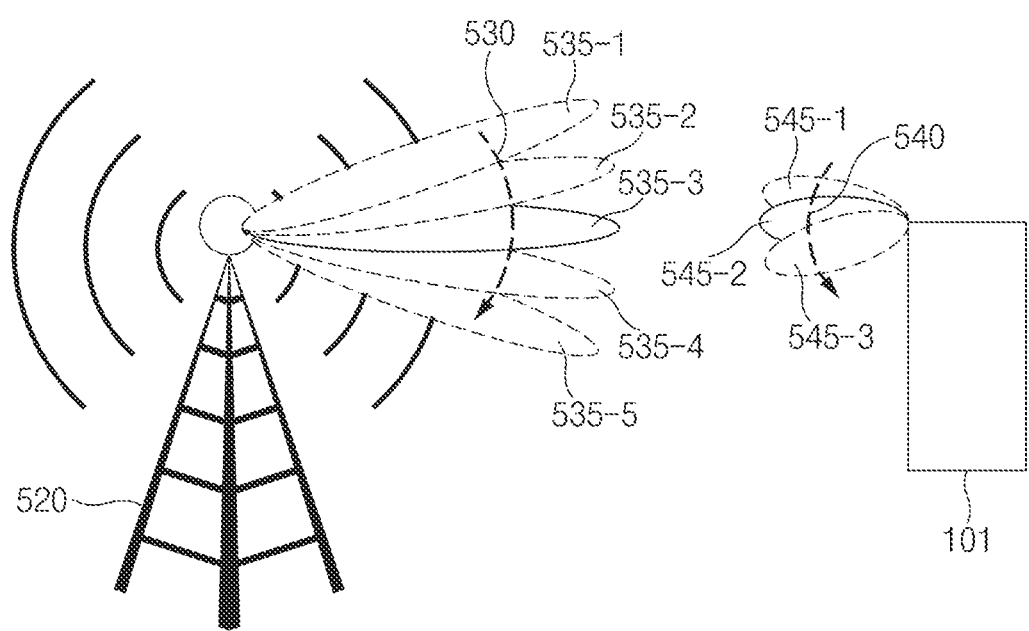
FIG. 5 illustrates an embodiment of an operation for a wireless communication connection between an electronic device and a base station using a directional beam for a wireless connection.

FIG. 5 illustrates an embodiment of an operation for a wireless communication connection between the electronic device 101 and a base station 520 by using a directional beam for wireless connection in the second network 294 (e.g., the network) of FIG. 2. First, the base station (gNodeB (gNB), transmission reception point (TRP)) 520 may perform a beam detection operation with the electronic device 101 for wireless communication connection. In the illustrated embodiment, for beam detection, the base station 520 may sequentially transmit a plurality of transmit beams, for example, first to fifth transmit beams 535-1 to 535-5 having different directions, thereby making it possible to perform at least one transmit beam sweeping 530.

The first to fifth transmit beams 535-1 to 535-5 may include at least one synchronization sequences (SS)/physical broadcast channel (PBCH) block (SS/PBCH Block). The SS/PBCH Block may be used to periodically measure a channel or beam strength of the electronic device 101.

In another embodiment, the first to fifth transmit beams 535-1 to 535-5 may include at least one channel state information-reference signal (CSI-RS). The CSI-RS is a reference signal that the base station 520 may set flexibly and may be transmitted periodically, semi-persistently or aperiodically. The electronic device 101 may measure a channel or beam strength by using the CSI-RS.

The transmit beams may form a radiation pattern having a selected beam width. For example, the transmit beams may have a broad radiation pattern having a first beam width or a sharp radiation pattern having a second beam width shaper than the first beam width. For example, transmit beams including SS/PBCH block may have a broader radiation pattern than transmit beams including CSI-RS.

The electronic device 101 may perform receive beam sweeping 540 while the base station 520 performs the transmit beam sweeping 530. For example, while the base station 520 performs first transmit beam sweeping 530, the electronic device 101 may fix a first receive beam 545-1 in a first direction to receive a signal of an SS/PBCH block transmitted in at least one of the first to fifth transmit beams 535-1 to 535-5. While the base station 520 performs second transmit beam sweeping 530, the electronic device 101 may fix a second receive beam 545-2 in a second direction to receive a signal of an SS/PBCH block transmitted in the first to fifth transmit beams 535-1 to 535-5. In this way, the electronic device 101 may select a communicable receive beam (e.g., the second receive beam 545-2) and transmit beam (e.g., the third transmit beam 535-3) based on the result of the signal reception operation through the receive beam sweeping 540.

As described above, after the communicable transmit and receive beams are determined, the base station 520 and the electronic device 101 may transmit and/or receive basic information for cell setting, and based on the information, set information for additional beam operation. For example, the beam operation information may include detailed information on a set beam, SS/PBCH Block, CSI-RS, or setting information on an additional reference signal.

In addition, the electronic device 101 may continuously monitor the channel and the strength of the beam by using at least one of the SS/PBCH Block and CSI-RS included in the transmit beam. The electronic device 101 may adaptively select a beam having good beam quality by using the monitoring operation. Optionally, when a communication connection is released due to movement of the electronic device 101 or blocking of a beam, the above-mentioned beam sweeping operation may be performed again to determine a communicable beam.

Figure 6:
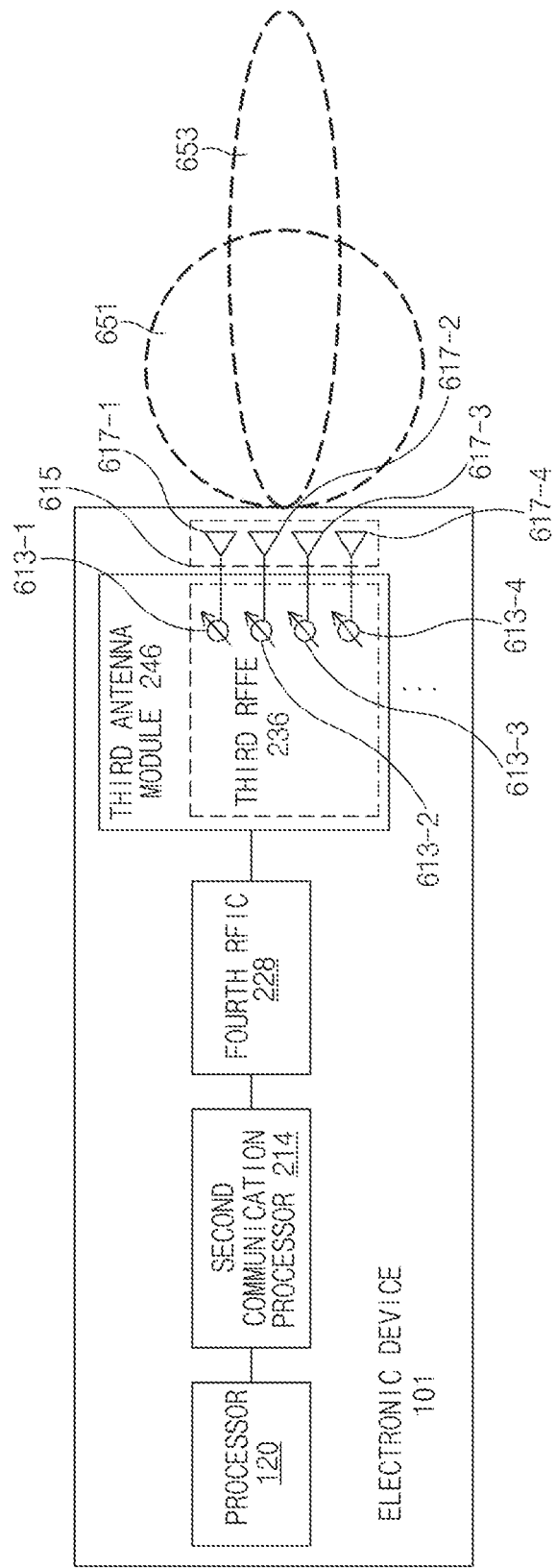
FIG. 6 illustrates a block diagram of an electronic device for 5G network communication according to an embodiment.

FIG. 6 illustrates a block diagram of the electronic device 101 for 5G network communication, according to an embodiment. The electronic device 101 may include various components illustrated in FIG. 2; however, for brief description, FIG. 6 illustrates the electronic device 101 as including the processor 120, the second communication processor 214, the fourth RFIC 228, and at least one third antenna module 246.

In the illustrated embodiment, the third antenna module 246 may include first to fourth phase shifters 613-1 to 613-4 (e.g., the phase shifter 238 in FIG. 2) and/or first to fourth antenna elements 617-1 to 617-4 (e.g., the antenna 248 in FIG. 2). Each of the first to fourth antenna elements 617-1 to 617-4 may be electrically connected to one of the first to fourth phase shifters 613-1 to 613-4 individually. The first to fourth antenna elements 617-1 to 617-4 may form at least one antenna array 615.

The second communication processor 214 may control the first to fourth phase shifters 613-1 to 613-4, thereby controlling the phases of the transmitted and/or received signals through the first to fourth antenna elements 617-1 to 617-4, which makes it possible to generate a transmit beam and/or a receive beam in a selected direction.

According to an embodiment, the third antenna module 246 may form a beam 651 of the broad radiation pattern (hereinafter, referred to as a 'broad beam') or a beam 652 of the sharp radiation pattern (hereinafter, referred to as a 'sharp beam') as mentioned above, depending on the number of the used antenna elements. For example, the third antenna module 246 may form the sharp beam 652 when all of the first to fourth antenna elements 617-1 to 617-4 are used, and form the broad beam 651 when only the first antenna element 617-1 and the second antenna element 617-2 are used. The broad beam 651 has a broader coverage than the sharp beam 652, but has a small antenna gain, and thus it may be more effective when searching for a beam. On the other hand, the sharp beam 652 has a narrower coverage than the broad beam 651, but has a higher antenna gain, and thus it may improve communication performance.

According to an embodiment, the second communication processor 214 may utilize a sensor module 176 (e.g., a 9-axis sensor, grip sensor, or GPS) for beam search. For example, the electronic device 101 may adjust a beam search position and/or a beam search period based on the position and/or movement of the electronic device 101 by using the sensor module 176. For another example, when the electronic device 101 is gripped by a user, an antenna module having better communication performance may be selected from among the plurality of third antenna modules 246 by identifying the gripping part of the user using a grip sensor.

Referring to FIG. 5, according to various embodiments, the electronic device 101 may measure only some of a plurality of transmit beams (e.g. 535-1 to 535-5) transmitted by the base station 520. For example, the electronic device 101 may identify at least one transmit beam to be measured and/or received from among the plurality of transmit beams by using at least one first receive beam formed according to a first beam book.

According to an embodiment, referring to FIG. 3, the electronic device 101 may form an omni-directional or non-beamformed receive beam by using at least one of a plurality of antenna elements (e.g., 332, 334, 336, and 338 of FIG. 3) of the antenna array 330. For example, the omni-directional or non-beamformed receive beam may correspond to the beam 651 of the broad radiation pattern of FIG. 6. For example, an omni-directional or non-beamformed receive beam may correspond to a first beam included in a first beam book of the electronic device 101. For example, the first beam book may include at least one first beam.

According to an embodiment, referring to FIG. 5, the electronic device 101 may receive, through a plurality of transmit beams (e.g., 535-1 to 535-5) transmitted from the base station 520, a plurality of synchronization signal blocks SSB corresponding to a plurality of transmit beams, respectively, by using an omni-directional or non-beamformed receive beam (e.g., at least one first receive beam).

According to an embodiment, the electronic device 101 may identify one of a plurality of transmit beams (e.g., 535-1 to 535-5) based at least in part on the reception result of the plurality of synchronization signal blocks. For example, the electronic device 101 may measure the reception strength of the plurality of synchronization signal blocks and select one of the plurality of transmit beams based at least in part on the measurement result. For example, the electronic device 101 may compare the reception strength of the plurality of synchronization signal blocks with a threshold value and select one of the plurality of transmit beams.

According to an embodiment, the electronic device 101 may receive, through some of a plurality of transmit beams (e.g., 535-1 to 535-5), at least one synchronization signal block corresponding to some of the transmit beams by using a plurality of receive beams (e.g., 545-1, 545-2, and 545-3). Referring to FIG. 3, the electronic device 101 may form a directional or beamformed receive beam by using a plurality of antenna elements (e.g., 332, 334, 336, and 338 of FIG. 3) of the antenna array 330. For example, the directional or beamformed receive beam may correspond to the beam 653 of the sharp radiation pattern of FIG. 6. For example, a directional or beamformed receive beam may correspond to a second receive beam included in a second beam book of the electronic device 101. For example, the second beam book may include a plurality of second receive beams. For example, the electronic device 101 may reduce the number of synchronization signal blocks of transmit beams from the base station 520 to be measured using the second beam book by using the first beam book, thereby making it possible to reduce the power consumption of the electronic device 101.

According to an embodiment, the electronic device 101 may identify the formation timing of the receive beam by using information included in at least one synchronization signal block corresponding to the selected or identified transmit beam. For example, the electronic device 101 may identify or obtain time information (e.g., information explicitly or implicitly indicating the transmission timing of the synchronization signal block corresponding to the transmit beam) of the selected transmit beam from the synchronization signal block corresponding to the selected or identified transmit beam. According to an embodiment, the electronic device 101 may form at least one directional receive beam (e.g., the second receive beam) based at least on the time information of the transmit beam. For example, the electronic device 101 may reduce power consumption of the electronic device 101 by forming a directional receive beam at a time corresponding to the time information of the transmit beam. According to an embodiment, the electronic device 101 may form at least one directional receive beam based on the direction of the transmit beam. For example, the electronic device 101 may reduce the power consumption of the electronic device 101 and the time taken to determine a beam pair of the electronic device 101 by using only some receive beams corresponding to the direction of the transmit beam among a plurality of directional receive beams (e.g., a plurality of second receive beams of the second beam book). In this case, the electronic device 101 may not form the directional receive beam in a different direction that does not correspond to the selected or identified transmit beam.

According to an embodiment, the beam book may include information on at least one beam. For example, the information on the beam may include beam index information. For example, the information on the beam may include complex weight information (e.g., phase and/or magnitude information) for a plurality of antennas (e.g., a plurality of antenna elements) for generating the beam. For example, the information on the beam may include precoding matrix information for a plurality of antennas for generating the beam.

According to an embodiment, the first beam book may refer to a group consisting of at least one first receive beam, and the second beam book may refer to a group consisting of a plurality of second receive beams. For example, the number of first receive beams included in the first beam book may be smaller than the number of second receive beams included in the second beam book.

According to an embodiment, a width of a main lobe of each of the first receive beams may be broader than a width of a main lobe of each of the second receive beams. For example, the first receive beam may be omni-directional or substantially omni-directional. For another example, the first receive beam may be non-directional or non-beamformed. For example, each of the plurality of second receive beams may be directional or beamformed.

According to an embodiment, the first receive beam may include a substantially broadest beam that may be generated by the electronic device 101. For example, the first receive beam may be a beam generated by using only one of a plurality of antenna elements included in each of the plurality of antenna modules included in the electronic device 101. For another example, the first beam may be a beam generated by using only one of the antenna elements of each of some of the plurality of antenna modules of the electronic device 101 used to generate the first beam.

According to an embodiment, the first receive beam may be a receive beam generated by using an antenna element of a separate independent antenna module included in the electronic device 101.

According to an embodiment, for an alternative purpose in terms of implementation, the first receive beam may include at least one of the first antenna module 242 of FIG. 2 or the second antenna module 244 of FIG. 2, which are included in the electronic device 101.

According to an embodiment, the second receive beam may be a beam generated by using a plurality of antenna elements included in each of at least one antenna module. For example, the electronic device 101 may form a second receive beam by applying beamforming to a plurality of antenna elements of the antenna module.

According to various embodiments, the electronic device 101 may use the first receive beam to filter the transmit beam. For example, the electronic device 101 may use the first receive beam to filter at least part of a transmit beam, and use the filtered at least portion of the transmit beam and the second receive beam to determine or identify a beam pair.

Figure 7:
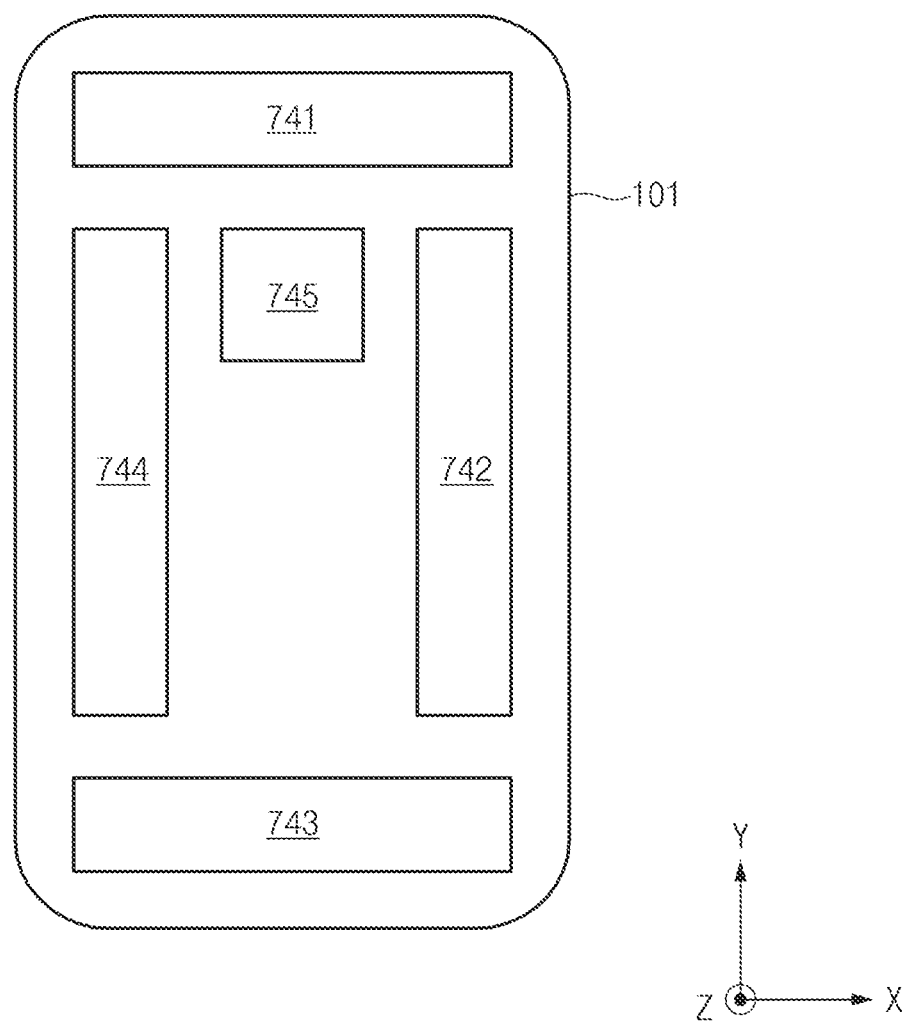
FIG. 7 illustrates an antenna module arrangement of an electronic device according to an embodiment.

FIG. 7 illustrates an antenna module arrangement of the electronic device 101 according to an embodiment.

According to an embodiment, the electronic device 101 may include a plurality of antenna arrays. For example, the electronic device 101 may include a first antenna array 741, a second antenna array 742, a third antenna array 743, a fourth antenna array 744, and a fifth antenna array 745. For example, the first antenna array 741, the second antenna array 742, the third antenna array 743, the fourth antenna array 744, and/or the fifth antenna array 745 may correspond to an antenna array (e.g., the antenna array 330 of FIG. 3) of the third antenna module 246 of FIG. 2.

Referring to FIG. 7, FIG. 7 illustrates an example of an antenna array arrangement when the electronic device 101 is viewed from the rear surface of the housing of the electronic device 101 (e.g., the surface opposite to the surface where the display is exposed to the outside). According to an embodiment, each of the plurality of antenna arrays may be disposed in or in a part of the housing of the electronic device 101 to cover different directions from each other. For example, the first antenna array 741 may form a beam in the upper direction (+Y direction) of the electronic device 101, the second antenna array 742 may form a beam in the left direction (+X direction) of the electronic device 101, the third antenna array 743 may form a beam in the lower direction (−Y direction) of the electronic device 101, the fourth antenna array 744 may form a beam in the right direction (−X direction) of the electronic device 101, and the fifth antenna array 745 may form a beam in the rear direction (+Z direction) of the electronic device 101.

The arrangement of the antenna arrays of the electronic device 101 of FIG. 7 is exemplary, and embodiments of the present disclosure are not limited thereto. For example, the first antenna array 741, the second antenna array 742, the third antenna array 743, the fourth antenna array 744, and the fifth antenna array 745 are merely presented just for describing that the antenna arrays are able to form a beam in all directions of the electronic device 101 (e.g., all directions except the front direction), and the configuration of the electronic device 101 is not limited to the configuration of FIG. 7. According to an embodiment, some of the plurality of antenna arrays may constitute one antenna module. For example, the third antenna array 743 and the fifth antenna array 745 may constitute one antenna module. According to an embodiment, some of the plurality of antenna arrays may be omitted. For example, the electronic device 101 may not include the third antenna array 743.

According to various embodiments, the electronic device 101 may generate at least one first receive beam by using at least one antenna array. For example, the electronic device 101 may generate at least one first receive beam based on a hardware configuration (e.g., configuration and arrangement of an antenna module) of the electronic device 101.

According to various embodiments, the electronic device 101 may form a first receive beam by using all antenna arrays or all antenna modules of the electronic device 101. For example, in this case, the electronic device 101 may generate the broadest beam that the electronic device 101 may generate by using all antenna arrays or all antenna modules. For example, the electronic device 101 may generate a broad beam by using only some (e.g., one antenna element) of a plurality of antenna elements of each of all antenna modules or all antenna arrays. In this case, the first beam book may include only one first receive beam. For example, when an omni-directional, substantially omni-directional, or non-directional beam is able to be formed by using all antenna modules simultaneously or substantially simultaneously, the electronic device 101 may form a first beam by using all the antenna modules.

According to various embodiments, the electronic device 101 may form a first beam by using some of the antenna modules of the electronic device 101. According to an embodiment, the electronic device 101 may generate the broadest beam that the electronic device 101 may generate by using at least some antenna modules. For example, the electronic device 101 may form a first-first receive beam using the first antenna array 741, a first-second receive beam using the second antenna array 742 using the second antenna module 742, a first-third receive beam using the third antenna array 743, a first-fourth receive beam using the fourth antenna array 744, and a first-fifth receive beam using the fifth antenna array 745. For another example, the electronic device 101 may form a first-first receive beam using the first antenna array 741 and the fifth antenna array 745 and a first-second receive beam using the second antenna array 742, the third antenna array 743, and/or the fourth antenna array 744. The first-first receive beam, the first-second receive beam, the first-third receive beam, the first-fourth receive beam, and/or the first-fifth receive beam may correspond to the first receive beams included in the first beam book, respectively.

According to various embodiments, according to an embodiment, the electronic device 101 may form a first beam by using some of the antenna elements of the first antenna array 741, some of the antenna elements of the second antenna array 742, some of the antenna elements of the third antenna array 743, some of the antenna elements of the fourth antenna array 744, and/or some of the antenna elements of the fifth antenna array 755. For example, if the first antenna array 741 includes four antenna elements, the electronic device 101 may form a broad beam by using only one of the four antenna elements. According to an embodiment, the electronic device 101 may form a broad beam by using at least one antenna element capable of forming the largest side lobe among the antenna elements of the antenna array. According to an embodiment, the electronic device 101 may increase the side lobe to widen a direction that one beam is able to cover, even if the main lobe of the beam by the antenna array is reduced. For example, the electronic device 101 may increase the side lobe by adjusting the gain and/or phase associated with each of a plurality of antenna elements in the antenna array.

According to various embodiments, the electronic device 101 may determine at least one synchronization signal block to be received and/or measured (e.g., the synchronization signal block corresponding to the identified and/or selected transmit beam) using the second beam book by receiving and/or measuring the synchronization signal block using at least one first receive beam belonging to the first beam book described above.

Figure 8:
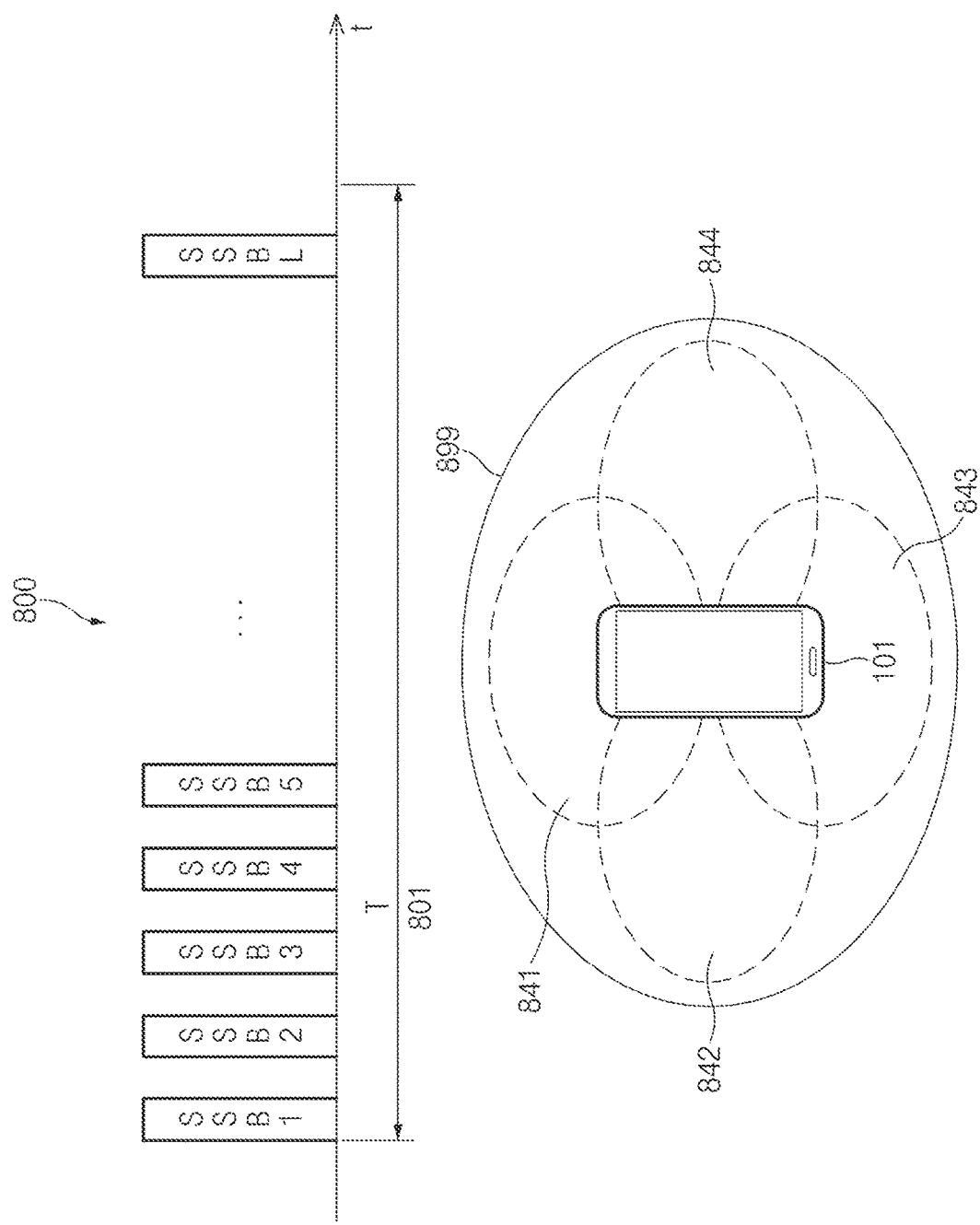
FIG. 8 illustrates reception of synchronization signal blocks using first receive beams according to an embodiment.

FIG. 8 illustrates reception 800 of synchronization signal blocks using a first receive beam according to an embodiment.

Referring to FIG. 8, for example, the electronic device 101 may form a first receive beam 899 by using all antenna modules of the electronic device 101. According to an embodiment, the electronic device 101 may form a first receive beam 899 by using a first-first receive beam 841 formed by using a first antenna array (e.g., the first antenna array 741 of FIG. 7), a first-second receive beam 842 formed using a second antenna array (e.g., the second antenna array 742 of FIG. 7), a first-third receive beam 843 formed using a third antenna array (e.g., the third antenna array 743 of FIG. 7), a first-fourth receive beam 844 formed using a fourth antenna array (e.g., the fourth antenna array 744 of FIG. 7), and a first-fifth receive beam (not shown) formed using a fifth antenna array (e.g., the fifth antenna array 745 of FIG. 7). For example, by forming the first receive beam 899 by using all antenna modules of the electronic device 101, the electronic device 101 may generate beam coverage that is able to cover all directions of the electronic device 101. For example, the electronic device 101 may support a first beam book including one first receive beam 899.

According to various embodiments, the electronic device 101 may receive a series of synchronization signal blocks SSB1, . . . , SSBL (L is a natural number equal to or greater than 2) from an external electronic device (e.g., the base station 520 of FIG. by using the first receive beam 899. For example, the series of synchronization signal blocks SSB1, . . . , SSBL may be synchronization signal blocks transmitted according to one beam sweeping of the external electronic device. For example, the electronic device 101 may receive the synchronization signal blocks SSB1, . . . , SSBL by using the first receive beam 899 included in the first beam book. In the example of FIG. 8, the electronic device 101 may receive the synchronization signal blocks SSB1, . . . , SSBL by using the first receive beam 899 during a first period 801. For example, the electronic device 101 may measure the reception strength of each synchronization signal block received from an external electronic device by using the first receive beam 899.

According to an embodiment, the electronic device 101 may determine at least one synchronization signal block to be received (e.g., measured) by using the second beam book, based on the reception strength (e.g., reception power) of each of the synchronization signal blocks received by using the first receive beam 899. For example, the electronic device 101 may identify at least one synchronization signal block to be measured by using at least one second receive beam of the second beam book of a synchronization signal block set, based at least on the strength of the synchronization signal block received and/or measured by using the first receive beam 899.

Figure 9:
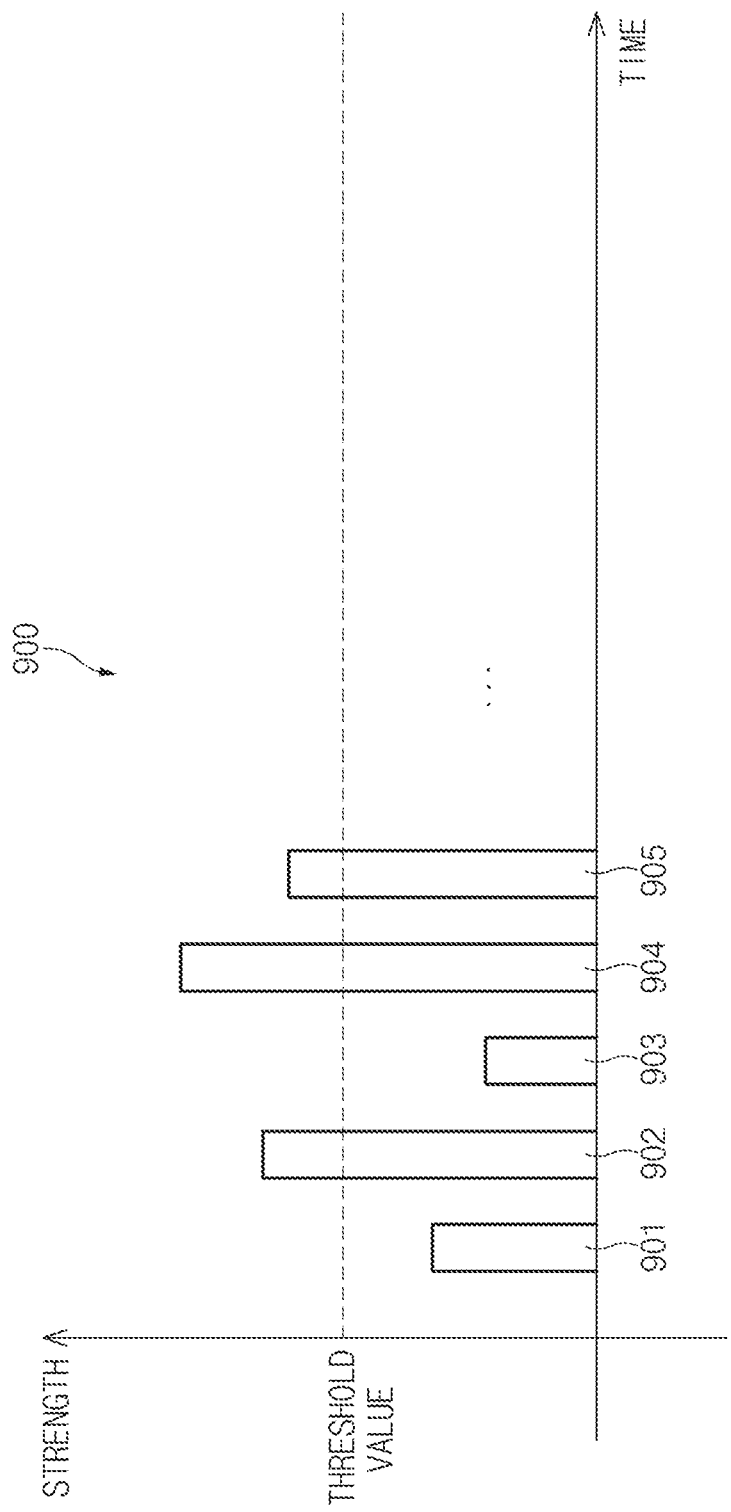
FIG. 9 illustrates reception power of synchronization signal blocks according to an embodiment.

FIG. 9 illustrates reception power 900 of synchronization signal blocks according to an embodiment.

According to various embodiments, the electronic device 101 may determine at least one synchronization signal block (or transmit beam) to be measured using the second receive beams among a plurality of synchronization signal blocks, based on a threshold value and the reception strength of each of the synchronization signal blocks received using the first receive beam (e.g., the first receive beam 899 of FIG. 8). For example, the electronic device 101 may select a synchronization signal block having a reception strength equal to or greater than a specified threshold value as at least one synchronization signal block to be measured using the second receive beams. For example, referring to FIGS. 8 and 9, the reception strength 901 of the first synchronization signal block SSB1 and the reception strength 903 of the third synchronization signal block SSB3 are less than a threshold value, and the reception strength 902 of the second synchronization signal block SSB2, the reception strength 904 of the fourth synchronization signal block SSB4, and the reception strength 905 of the fifth synchronization signal block SSB5 may be equal to or greater than the threshold value.

In this case, according to an embodiment, the electronic device 101 may receive and/or measure only at least some of synchronization signal blocks (e.g., the second synchronization signal block SSB2, the fourth synchronization signal block SSB4, and/or the fifth synchronization signal block SSB5) having the reception strength equal to or greater than the threshold value by using each of the plurality of second receive beams of the second beam book.

According to an embodiment, the electronic device 101 may perform reception and/or measurement using the second beam book only on a specified number of synchronization signal blocks among synchronization signal blocks having a reception strength equal to or greater than the threshold value. For example, if the number of synchronization signal blocks having a reception strength equal to or greater than the threshold value is less than a specified number, the electronic device 101 may receive and/or measure all synchronization signal blocks having a reception strength equal to or greater than the threshold value by using the second beam book. For another example, if the number of synchronization signal blocks having a reception strength equal to or greater than the threshold value is equal to or greater than a specified number, the electronic device 101 may receive and/or measure, by using the second beam book, a specified number of synchronization signal blocks having a reception strength higher than that of the remaining synchronization signal blocks, among the synchronization signal blocks having an reception strength equal to or greater than the threshold value. For example, when the specified number is 5 and the number of synchronization signal blocks having a reception strength equal to or greater than the threshold value is 6, the electronic device 101 may identify or determine top five synchronization signal blocks as synchronization signal blocks for reception and/or measurement using the second beam book, among the six synchronization signal blocks.

The number specified in the embodiment may not necessarily be set. For example, if there is no specified number of settings, all synchronization signal blocks having a reception strength equal to or greater than the threshold value may be received and/or measured by using the second beam book. According to an embodiment, the electronic device 101 may perform reception and/or measurement using the second beam book only on synchronization signal blocks corresponding to the highest reception strength, among synchronization signal blocks having a reception strength equal to or greater than the threshold value.

According to an embodiment, if there is no synchronization signal block having a reception strength equal to or greater than the threshold value, the electronic device 101 may receive and/or measure all synchronization signal blocks corresponding to one beam sweeping by using each of all the second receive beams of the second beam book.

Figure 10:
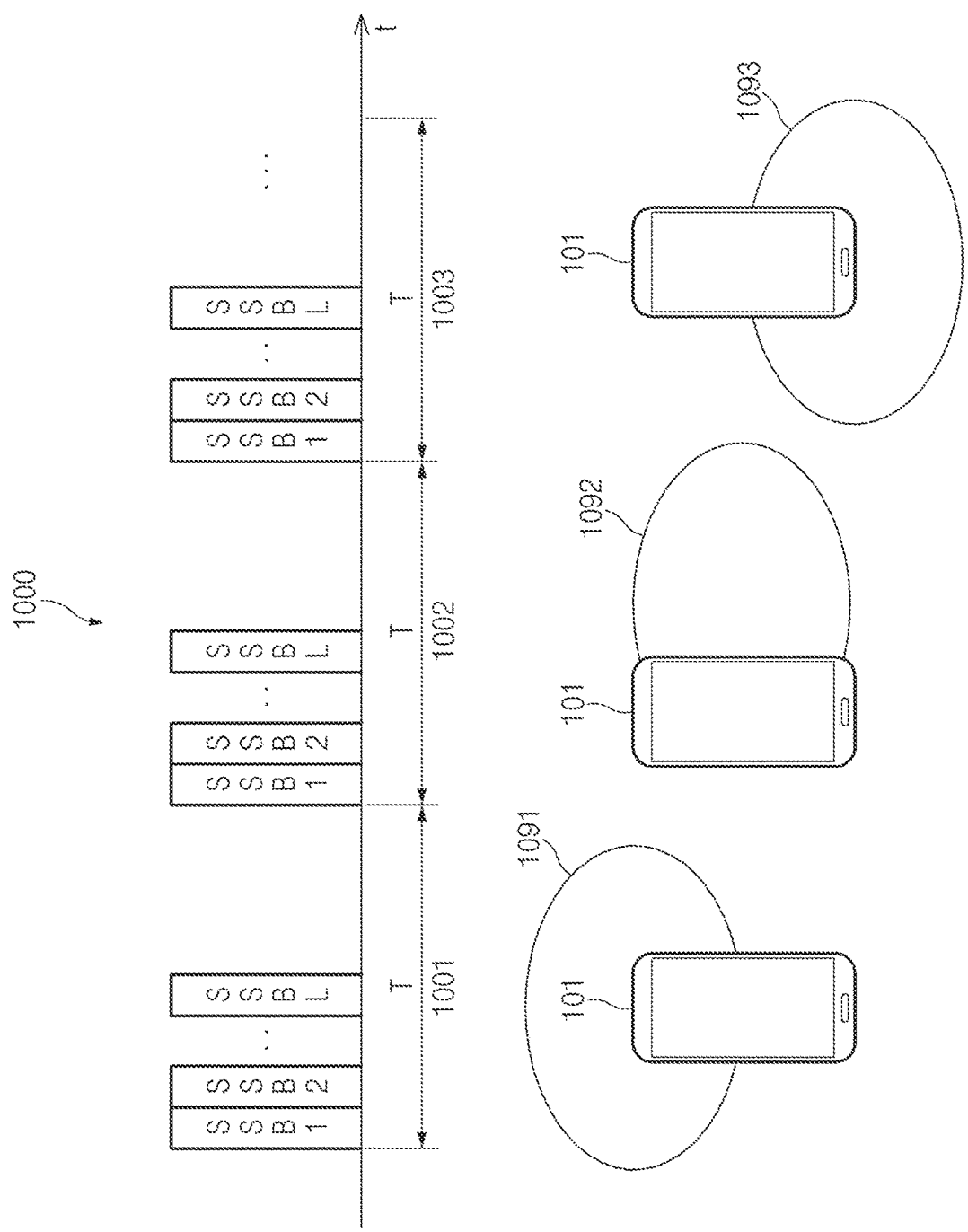
FIG. 10 illustrates reception of synchronization signal blocks using first receive beams according to an embodiment.

FIG. 10 illustrates reception 1000 of synchronization signal blocks using first receive beams according to an embodiment.

Referring to FIG. 10, for example, the electronic device 101 may use at least some of the antenna modules (e.g., the third antenna module 246 of FIG. 2) of the electronic device 101 to generate three first beams. For example, the electronic device 101 may include three first receive beams in a first beam book. According to various embodiments, the electronic device 101 may support a first beam book including a plurality of first receive beams. For example, the electronic device 101 may form a first-first receive beam 1091 by using at least some of the antenna modules (e.g., the first antenna array 741 and the fifth antenna array 745 of FIG. 7) of the electronic device 101, form a first-second receive beam 1092 by using at least some of the antenna modules (e.g., the fourth antenna array 744 of FIG. 7), and form a first-third receive beam 1093 by using at least some of the antenna modules (e.g., the second antenna array 742 and the third antenna array 743). According to an embodiment, the electronic device 101 may form a first receive beam by using some antenna elements of some of the antenna modules of the electronic device 101. For example, the electronic device 101 may form a first receive beam by using some (e.g., one antenna element) of a plurality of antenna elements included in the antenna module. For example, the electronic device 101 may form the first-first receive beam 1091 by using one of the antenna elements of the first antenna array 741 of FIG. 7 and one of the antenna elements of the fifth antenna array 745. The electronic device 101 may form the first-second receive beam 1092 by using one of antenna elements of the fourth antenna array 744 of FIG. 7. The electronic device 101 may form the first-third receive beam 1093 by using one of the antenna elements of the second antenna array 742 of FIG. 7 and one of the antenna elements of the third antenna array 743.

According to various embodiments, in a first beam sweeping period 1001, the electronic device 101 may receive a plurality of synchronization signal blocks from an external electronic device (e.g., the base station 520 of FIG. 5) by using the first-first receive beam 1091. In a second beam sweeping period 1002, the electronic device 101 may receive a plurality of synchronization signal blocks by using the first-second receive beam 1092. In a third beam sweeping period 1003, the electronic device 101 may receive a plurality of synchronization signal blocks by using the first-third receive beam 1093. For example, the electronic device 101 may measure the reception strength of each of the plurality of synchronization signal blocks received from the external electronic device by using each of the plurality of first receive beams included in the first beam book. The plurality of first receive beams (e.g., the first-first receive beam 1091, the first-second receive beam 1092, and the first-third receive beam 1093) illustrated in FIG. 10 are exemplary, and the embodiments of the present disclosure are not limited thereto.

According to an embodiment, the electronic device 101 may determine or identify a synchronization signal block to be received (e.g., measured) using the second beam book, based on the reception strength (e.g., reception power) of each of the synchronization signal blocks received by using each of the plurality of first receive beams (e.g., the first-first receive beam 1091, the first-second receive beam 1092, and the first-third receive beam 1093). For example, the electronic device 101 may identify a synchronization signal block to be measured by using the second receive beams of the second beam book of a synchronization signal block set, based at least on the reception strength of the synchronization signal block received and/or measured by using each of the plurality of first receive beams (e.g., the first-first receive beam 1091, the first-second receive beam 1092, and the first-third receive beam 1093).

Figure 11:
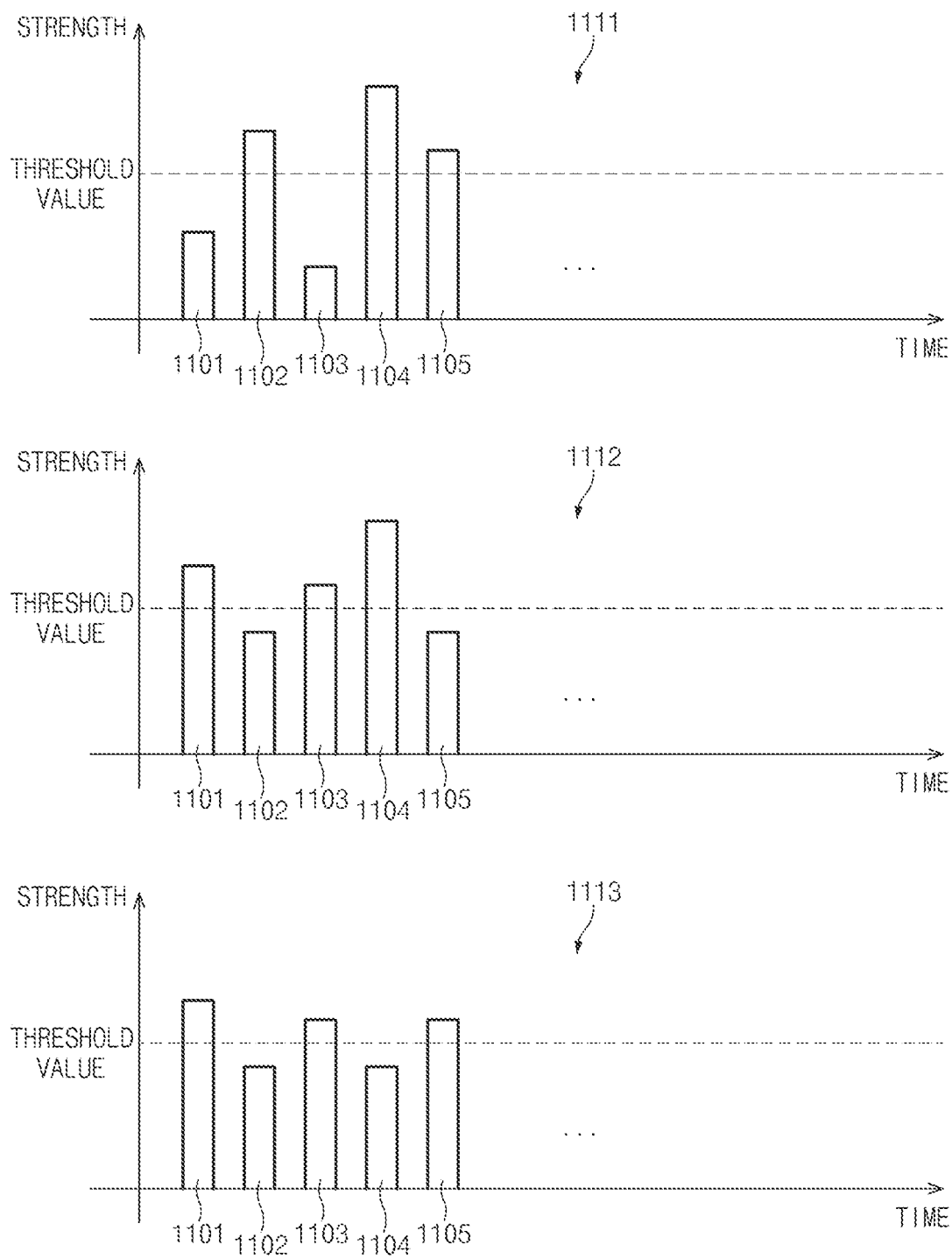
FIG. 11 illustrates reception power of synchronization signal blocks according to an embodiment.

FIG. 11 illustrates reception power of synchronization signal blocks according to an embodiment.

Referring to FIGS. 10 and 11, for example, reference numeral 1111 denotes reception strengths (e.g., reception powers) of synchronization signal blocks that the electronic device 101 receives during the first sweeping period 1001 by using the first-first receive beam 1091. For example, reference numeral 1112 denotes reception strengths (e.g., reception powers) of synchronization signal blocks that the electronic device 101 receives during the second sweeping period 1002 by using the first-second receive beam 1092. For example, reference numeral 1113 denotes reception strengths (e.g., reception powers) of synchronization signal blocks that the electronic device 101 receives during the third sweeping period 1003 by using the first-third receive beam 1093.

As illustrated in FIG. 11, if the electronic device 101 receives the synchronization signal blocks by using the plurality of first receive beams, the electronic device 101 may store information (e.g., a synchronization signal block index) on at least one synchronization signal block of which the reception strength, which is measured by using each of the first receive beams, is equal to or greater than a threshold value. For example, the electronic device 101 may determine or identify at least one synchronization signal block to be measured using the second beam book, by using information on at least one synchronization signal block equal to or greater than a stored threshold value.

According to various embodiments, the electronic device 101 may obtain an average of the reception strengths of the respective synchronization signal blocks based on reception strengths (e.g., reception powers) of the respective synchronization signal blocks measured by using a plurality of first receive beams. For example, the electronic device 101 may calculate a reception strength average SSBi,avg using the first beam book of the i-th synchronization signal block according to Equation 1 below.

$$SSB_{i,avg} = aSSB_i^1 + bSSB_i^2 + (1-a-b)SSB_i^3 \quad \text{Equation 1}$$

In Equation 1 above, SSBin may represent the reception strength (e.g., reception power (e.g., reference signal reception power)) of the i-th synchronization signal block in the synchronization signal block set measured using the n-th first receive beam (e.g., 1-n-th receive beam). a and b are specified weights, and each of a and b may be any integer of 0 or more and 1 or less. For example, a may mean a weight for the first-first receive beam 1091, b may mean a weight for the first-second receive beam 1092, and (1-a-b) may mean a weight for the first-third receive beam 1093. According to an embodiment, each of a and b may be a specified value. For example, a weight for a beam capable of covering a broader range may be set to be relatively higher than other weights. According to an embodiment, the electronic device 101 may adjust the values of a and b based on the reception strength. For example, the electronic device 101 may adjust the value of a to be larger when the reception strength received by the first-first receive beam 1091 is equal to or greater than the reception strength received by the first-second receive beam 1092 or the first-third receive beam 1093 by a specified value or more. For example, by increasing the value of a, the electronic device 101 may reduce the influence of the measurement result by the first-second receive beam 1092 and the first-third receive beam 1093.

According to an embodiment, the electronic device 101 may determine at least one synchronization signal block to be measured using the second receive beams among the plurality of synchronization signal blocks based on the average reception strength and the threshold value. For example, the electronic device 101 may select at least one synchronization signal block having an average reception strength equal to or greater than a specified threshold value as at least one synchronization signal block to be measured using the second receive beams.

According to an embodiment, the electronic device 101 may perform reception and/or measurement using the second beam book only on a specified number of synchronization signal blocks among synchronization signal blocks having an average reception strength equal to or greater than the threshold value. For example, if the number of synchronization signal blocks having an average reception strength equal to or greater than the threshold value is less than a specified number, the electronic device 101 may receive and/or measure all synchronization signal blocks having an average reception intensity equal to or greater than the threshold value by using the second beam book. For another example, if the number of synchronization signal blocks having an average reception strength equal to or greater than the threshold value is equal to or greater than a specified number, the electronic device 101 may receive and/or measure, by using the second beam book, a specified number of synchronization signal blocks having an average reception strength higher than that of the remaining synchronization signal blocks, among the synchronization signal blocks having an average reception strength equal to or greater than the threshold value. For example, when the specified number is 5 and the number of synchronization signal blocks having an average reception strength equal to or greater than the threshold value is 6, the electronic device 101 may determine that the top five synchronization signal blocks having a high reception strength are synchronization signal blocks for reception and/or measurement using the second beam book, among the six synchronization signal blocks.

The number specified in the embodiment may not necessarily be set. For example, if there is no specified number of settings, all synchronization signal blocks having a reception strength equal to or greater than the threshold value may be received and/or measured by using the second beam book.

According to an embodiment, the electronic device 101 may perform reception and/or measurement using the second beam book only on synchronization signal blocks corresponding to the highest average reception strength, among synchronization signal blocks having an average reception strength equal to or greater than the threshold value.

According to an embodiment, if there is no synchronization signal block having an average reception strength equal to or greater than the threshold value, the electronic device 101 may receive and/or measure all synchronization signal blocks corresponding to one sweeping period by using each of all the second beams of the second beam book.

Figure 12:
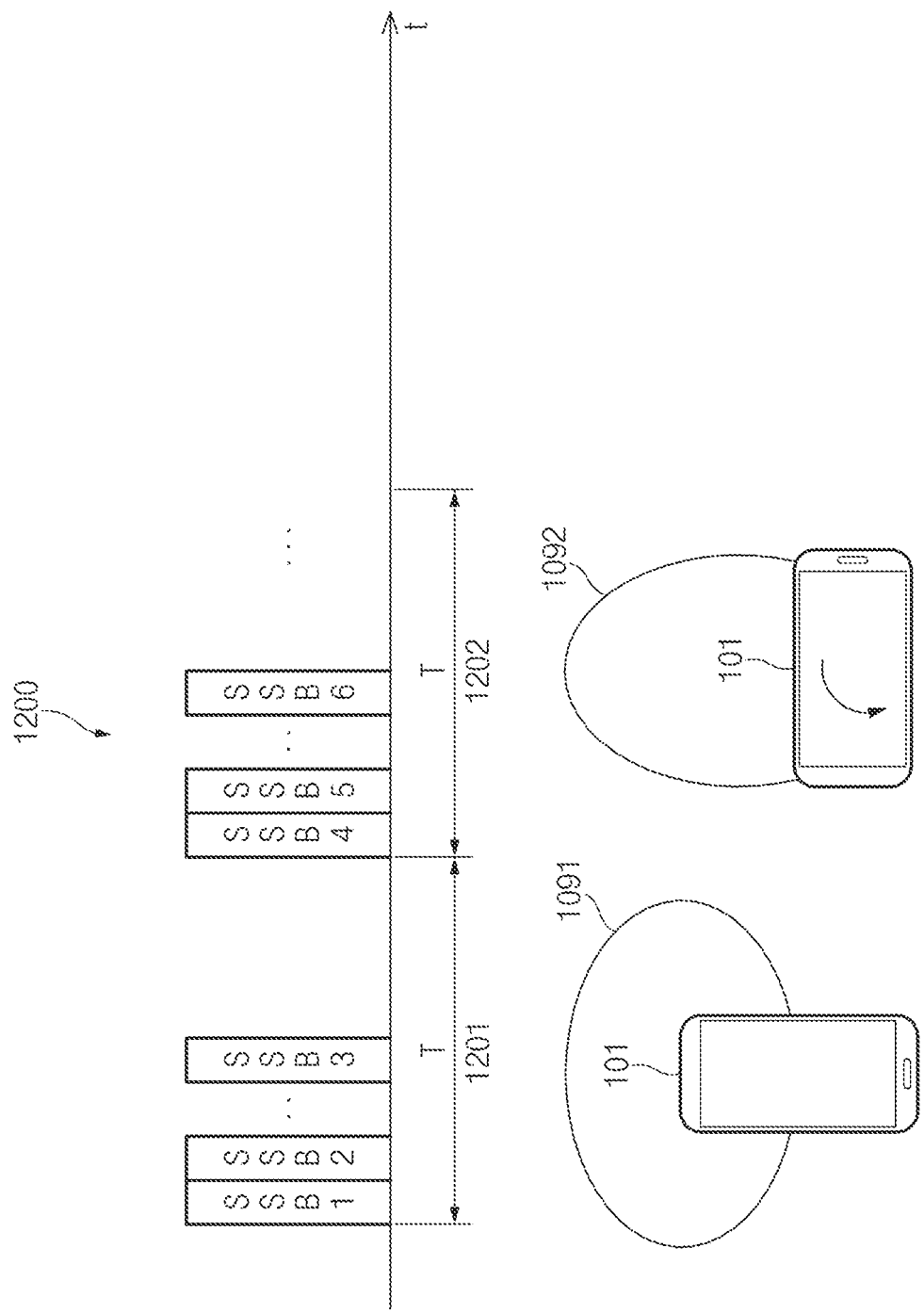
FIG. 12 is a diagram for describing reception of synchronization signal blocks according to a change in orientation of an electronic device.

FIG. 12 is a diagram for describing reception 1200 of synchronization signal blocks according to a change in orientation of the electronic device 101.

In the example of FIG. 12, the electronic device 101 may receive the synchronization signal blocks in a first beam sweeping period 1201 by using the first-first receive beam 1091, and may receive the synchronization signal blocks in a second beam sweeping period 1202 by using the first-second receive beam 1092. As described above with reference to FIGS. 10 and 11, when the electronic device 101 supports a plurality of first receive beams, the respective first receive beams (e.g., the first receive beam 1091, the second receive beam 1092, and the third receive beam 1093 of FIG. 10) may be beams formed in different directions with respect to the electronic device 101. For example, as illustrated in FIG. 10, the first-first receive beam 1091 is a beam formed in an upward direction of the electronic device 101, and the first-second receive beam 1092 is a beam formed in a right direction of the electronic device.

Referring to FIG. 12, the orientation of the electronic device 101 may be changed in the first beam sweeping period 1201 and the second beam sweeping period 1202. For example, in the second beam sweeping period 1202, the orientation of the electronic device 101 may rotate 90 degrees counterclockwise from the orientation of the first beam sweeping period 1201. In this case, the first-first receive beam 1091 and the first-second receive beam 1092 may be formed in substantially the same direction. Accordingly, when a plurality of first receive beams are used, the electronic device 101 may perform measurement in substantially the same direction in the first beam sweeping period 1201 and the second beam sweeping period 1202 with the change in orientation of the electronic device 101. In this case, the electronic device 101 may not obtain a valid measurement result due to the change in orientation.

According to an embodiment, when the electronic device 101 supports a plurality of first receive beams, the electronic device 101 may determine whether the measured reception strength is valid based on the change in orientation of the electronic device 101. For example, the electronic device 101 may determine that the reception strength measured using the first beams is valid only when the change in orientation of the electronic device 101 is within a specified range, until the reception of the synchronization signal blocks using all of the plurality of first receive beams in the first beam book is finished. For example, if the change in orientation of the electronic device 101 is equal to or greater than a specified range before the measurement of the synchronization signal blocks using the first beam book is completed, the electronic device 101 may restart the measurement of the synchronization signal blocks using the first beam book. For another example, if the change in orientation of the electronic device 101 is equal to or greater than a specified range before the measurement of synchronization signal blocks using the first beam book is completed, the electronic device 101 may end the measurement using the first beam book and may perform measurement on all synchronization signal blocks using the second beam book.

Figure 13:
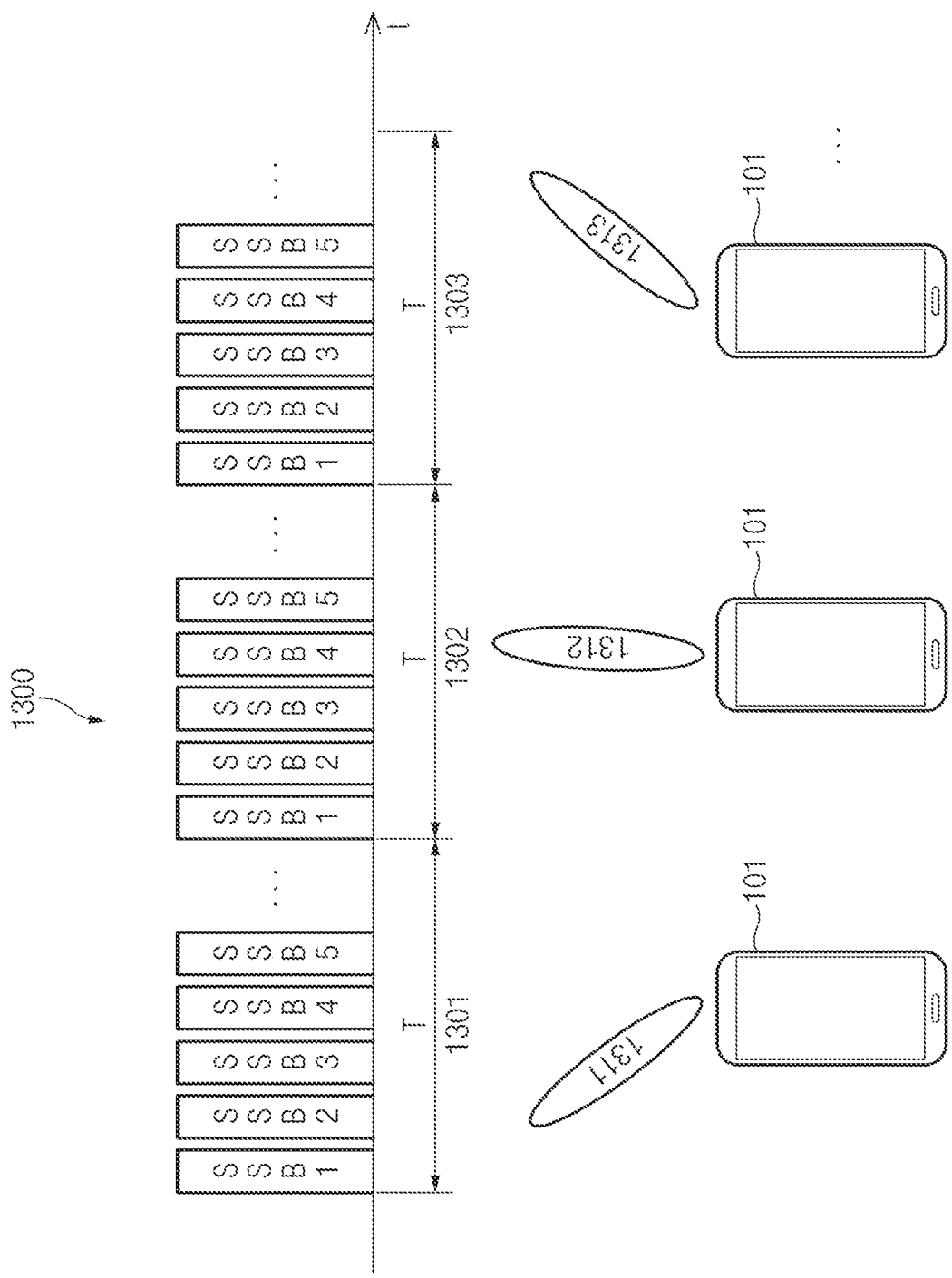
FIG. 13 illustrates reception of synchronization signal blocks using second receive beams according to an embodiment.

FIG. 13 illustrates reception 1300 of synchronization signal blocks using second beams according to an embodiment.

According to various embodiments, the electronic device 101 may receive and/or measure at least some of the synchronization signal blocks by using the second beam book based on the measurement result based on the first beam book (e.g., the result of reception or measurement of the first beam book-based synchronization signal blocks described above with reference to FIGS. 8 to 10). For example, the electronic device 101 may receive and/or measure at least one synchronization signal block (e.g., at least one synchronization signal block determined or identified using the first beam book) in a first beam sweeping period 1301 by using a second-first receive beam 1311 (e.g., the first receive beam 545-1 of FIG. 5), among synchronization signal blocks of one beam sweeping period, receive and/or measure at least one synchronization signal block in a second beam sweeping period 1302 by using a second-second receive beam 1312 (e.g., the second receive beam 545-2 of FIG. 5), and receive and/or measure some of the synchronization signal blocks in a third beam sweeping period 1303 by using a second-third receive beam 1313 (e.g., the third receive beam 545-3 of FIG. 5). For example, the electronic device 101 may receive and/or measure at least one synchronization signal block by using all of a plurality of second receive beams included in the second beam book.

According to various embodiments, the electronic device 101 may determine or identify an optimal beam pair (e.g., a combination of a transmit beam and a receive beam) by receiving at least one synchronization signal block by using the second beam book. For example, the electronic device 101 may determine that a combination of a transmit beam corresponding to one synchronization signal block having the highest reception power and a second receive beam is an optimal beam pair. For example, the electronic device 101 may determine a beam pair for initial access and/or random access. In determining a beam pair, the electronic device 101 may receive and/or measure only some of the synchronization signal blocks by using the measurement result using the first receive beams, thereby making it possible to reduce power consumption for the beam pair determination (e.g., beam search).

Figure 14:
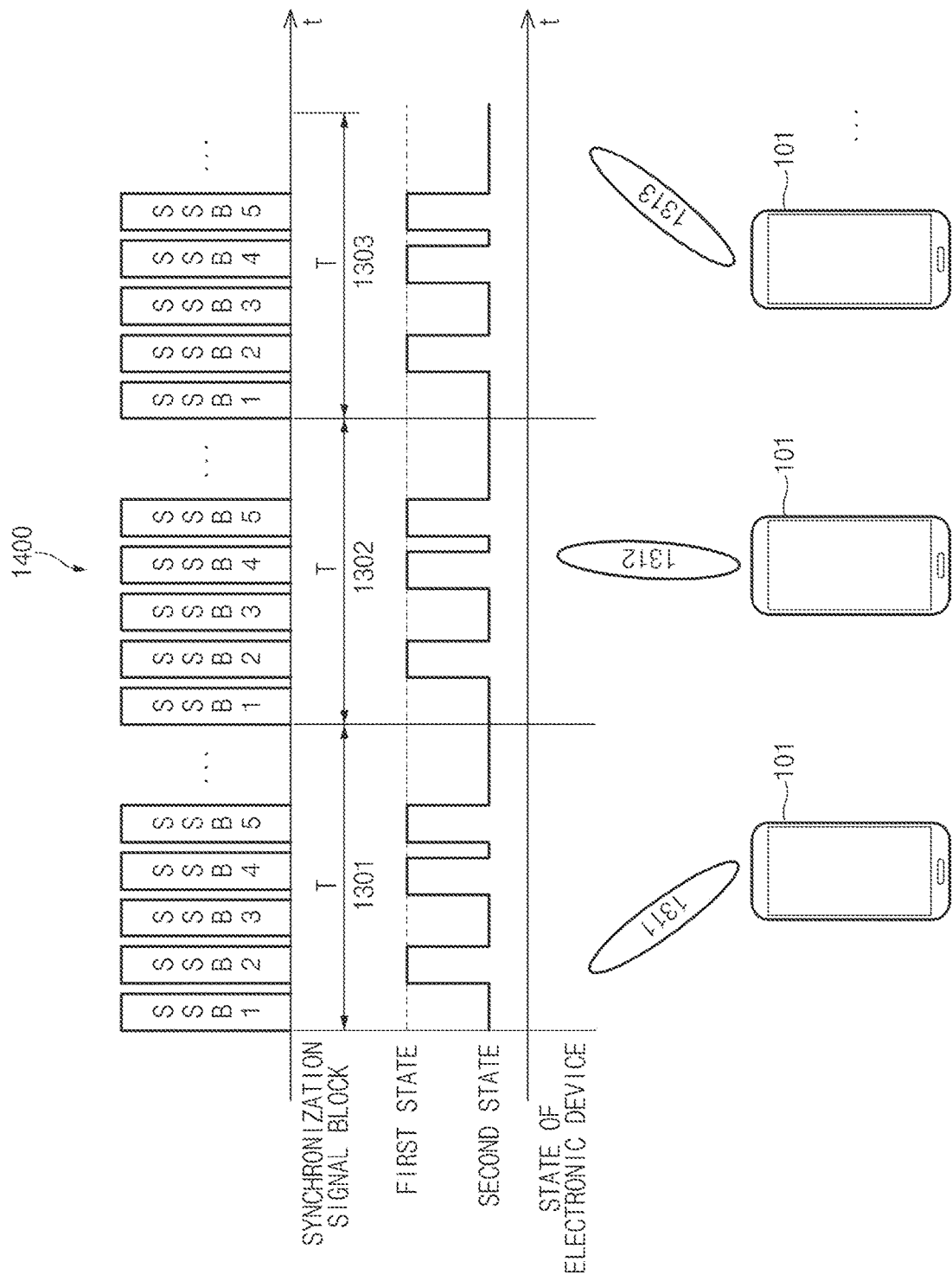
FIG. 14 illustrates a state change of an electronic device depending on reception of synchronization signal blocks by using second receive beams according to an embodiment.

FIG. 14 illustrates a state change 1400 of the electronic device 101 depending on reception of synchronization signal blocks using second receive beams according to an embodiment.

Referring to FIG. 14, for example, the electronic device 101 may determine that measurements of the second synchronization signal block SSB2, the fourth synchronization signal block SSB4, and the fifth synchronization signal block SSB5 are to be performed by using the second beam book, based at least on the measurement result using the first beam book.

According to various embodiments, the electronic device 101 may perform reception and/or measurement only on the synchronization signal block to be measured by using the second beam book, which is determined among a plurality of synchronization signal blocks. Examples of the reception and/or measurement of the synchronization signal block may include detection of a synchronization signal (PSB and/or SSB) included in the synchronization signal block, measurement of reception power, and/or decoding of a physical broadcast channel (PBCH). Accordingly, by performing reception and/or measurement only on at least one synchronization signal block, the electronic device 101 may reduce power consumption for beam pair determination (e.g., beam search).

According to an embodiment, the electronic device 101 may receive the synchronization signal blocks by using the first beam book, thereby making it possible to determine at least one synchronization signal block to be received and/or measured and the receive timing of the at least one synchronization signal block by using the second beam book. The electronic device 101 may receive and/or measure at least one synchronization signal block by using the second beam book, by using the synchronization signal block and the receive timing of the synchronization signal block which are determined by using the first beam book.

Referring to FIG. 14, according to an embodiment, the electronic device 101 may control a state of the electronic device 101 based on the receive timing of at least one determined synchronization signal block to be received and/or measured by using the second beam book. For example, the electronic device 101 may control the communication circuit (e.g., the second communication processor 214, the fourth RFIC 228, and/or the third antenna module 246 of FIG. 2) of the electronic device 101 to be in a first state (e.g., an active state or wakeup state) or a second state (e.g., an inactive state or idle state), based on the timing of the determined synchronization signal block to be received and/or measured using the second beam book. For example, the first state may refer to a state in which power consumption of the communication circuit of the electronic device 101 is relatively high compared to the second state. For example, the electronic device 101 may transit the communication circuit to the first state and perform measurement on it only at the timing of the determined synchronization signal block to be received and/or measured by using the second beam book, and may maintain the communication circuit in the second state at the receive timing of the remaining synchronization signal blocks in the synchronization signal block set.

For example, referring to FIG. 14, the electronic device 101 may transition from the second state to the first state at the receive timing of the second synchronization signal block SSB2 of the first beam sweeping period 1301 to receive the second synchronization signal block SSB2 by using the second-first receive beam 1311. After receiving the second synchronization signal block SSB2, the electronic device 101 may transition back to the first state. At the receive timing of the fourth synchronization signal block SSB4, the electronic device 101 may transition from the second state to the first state to receive the fourth synchronization signal block SSB4 by using the second-first receive beam 1311. After receiving the fourth synchronization signal block SSB4, the electronic device 101 may transition back to the first state. At the receive timing of the fifth synchronization signal block SSB5, the electronic device 101 may transition from the second state to the first state to receive the fifth synchronization signal block SSB5 by using the second-first receive beam 1311. After receiving the fifth synchronization signal block SSB5, the electronic device 101 may transition back to the first state. Similarly, the electronic device 101 may receive the second synchronization signal block SSB2, the fourth synchronization signal block SSB4, and the fifth synchronization signal block SSB5 by using the second-second receive beam 1312 in the second beam sweeping period 1302, and using the second-third receive beam 1313 in the third beam sweeping period 1303.

According to various embodiments, the electronic device 101 may determine a beam pair by using the first beam book and the second beam book. According to an embodiment, the electronic device 101 may access a network by using a random access resource indicated by a PBCH of a synchronization signal block corresponding to a transmit beam of the beam pair determined by using the second beam book.

According to an embodiment, the electronic device 101 may determine the beam pair using the first beam book and the second beam book based on a block error rate after network access and/or a timer. For example, the electronic device 101 may set a specified timer (e.g., TxReduceTimer) after accessing the network, and determine the beam pair using the above-described first beam book and second beam book when the specified timer expires. For example, if a block error rate after network access is equal to or greater than a specified value, the electronic device 101 may determine the beam pair using the above-described first beam book and second beam book.

According to various embodiments, the electronic device 101 may not perform filtering using the first beam book based on the reception strength of the synchronization signal block using the first beam. For example, if the signal reception strength of the synchronization signal block received by using the first beam is less than a specified threshold value, the electronic device 101 may omit reception of the synchronization signal block set by using the first beam book and receive all synchronization signal blocks by using the second beam book. For example, if the signal reception strength of at least one synchronization signal block received by using at least one first receive beam (e.g., the average reception strength of at least one synchronization signal block) is less than a specified threshold value, the electronic device 101 may omit reception of the synchronization signal block set by using the first beam book and receive all synchronization signal blocks by using the second beam book. For example, the electronic device 101 may determine the signal reception strength of at least one synchronization signal block received by using the first receive beam based on the reception strength of the PSS or SSS of the synchronization signal block, or a demodulation reference signal (DM-RS) existing in the PBCH region.

Figure 15:
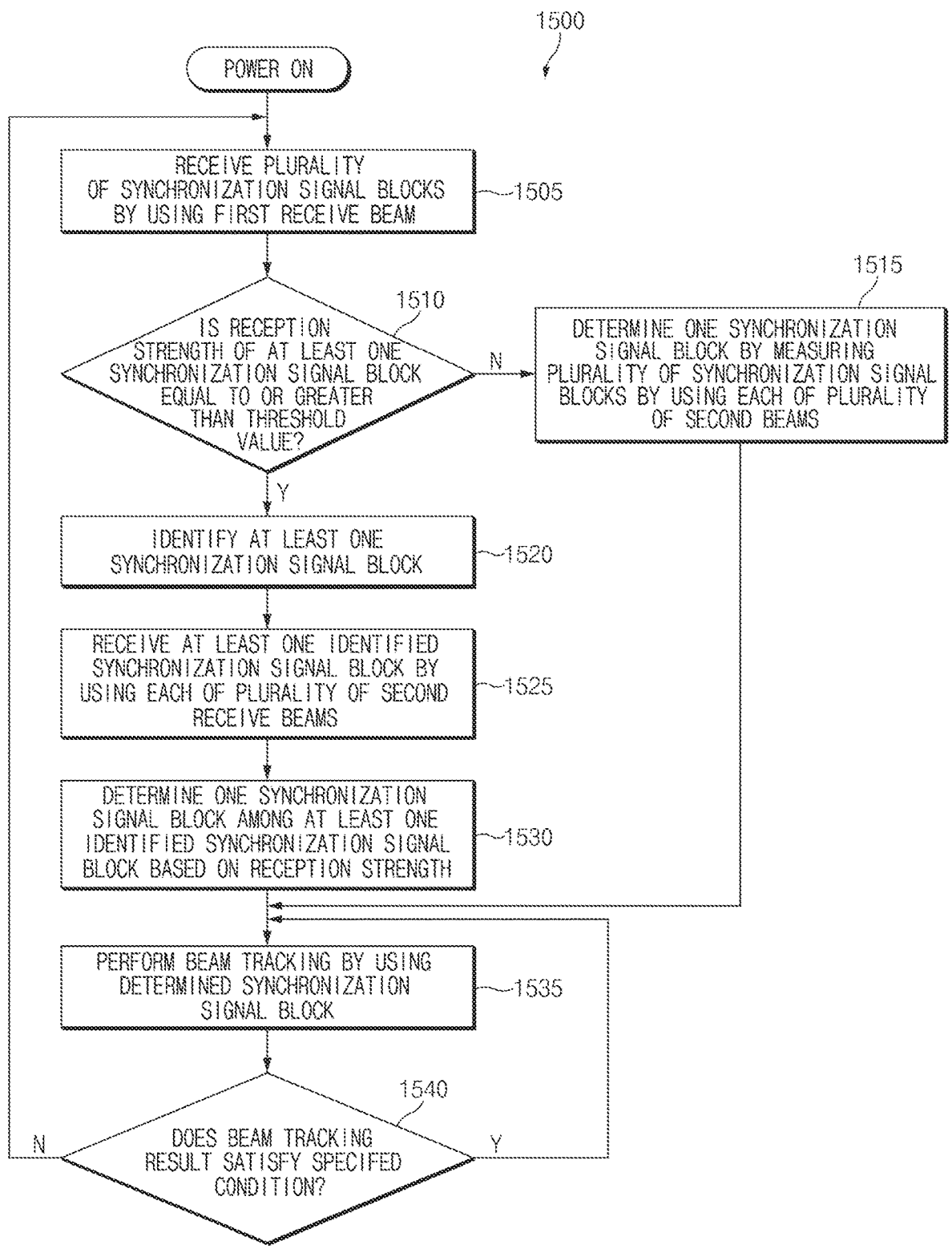
FIG. 15 shows a flowchart of a method for determining a beam pair according to various embodiments.

FIG. 15 shows a flowchart 1500 of a method for determining a beam pair according to various embodiments.

According to various embodiments, in operation 1505, the electronic device 101 (e.g., the processor 120 and/or the communication module 190 of FIG. 1) may receive a plurality of synchronization signal blocks by using at least one first receive beam. For example, the electronic device 101 may perform operation 1505 for initial access according to power-on of the electronic device 101. For another example, the electronic device 101 may perform operation 1505 for random access. The first receive beam is a beam included in the first beam book, and the number of first receive beams may be smaller than the number of second receive beams included in the second beam book. The width of a main lobe of each of the first receive beams may be broader than a width of the main lobe of each of the second receive beams. For example, the first receive beam may be omni-directional, substantially omni-directional, non-directional, or non-beamformed. For example, each of the second receive beams may be directional or beamformed. According to an embodiment, the first receive beam may include a substantially broadest beam that may be generated by the electronic device 101. For example, the first beam may be a beam generated by using only one of a plurality of antenna elements included in each of the plurality of antenna modules included in the electronic device 101. For another example, the first receive beam may be a beam generated by using only one of the antenna elements of each of some of the plurality of antenna modules of the electronic device 101 used to generate the first receive beam. According to an embodiment, the electronic device 101 may measure the reception strength of a plurality of synchronization signal blocks received by using the first receive beam.

According to various embodiments, in operation 1510, the electronic device 101 may determine whether the reception strength of at least one synchronization signal block received by using the first receive beam is equal to or greater than a threshold value. For example, the electronic device 101 may determine the reception strength of the synchronization signal block based on reception power (e.g., reference signal reception power) of the synchronization signal block. For example, the electronic device 101 may determine whether the reception strength of at least one synchronization signal block is equal to or greater than a threshold value based on the reception strength of the PSS or SSS of the synchronization signal block, or a demodulation reference signal (DM-RS) existing in the PBCH region. For example, in operation 1510, the electronic device 101 may determine whether an average of reception strengths of a specified number of synchronization signal blocks is equal to or greater than a threshold value.

According to various embodiments, if the reception strength of each of the at least one synchronization signal block received by using the first receive beam is less than a specified threshold value, in operation 1515, the electronic device 101 may determine one synchronization signal block by measuring the synchronization signal blocks using each of a plurality of second receive beams. For example, the electronic device 101 may determine a beam pair (e.g., a pair of a transmit beam and a receive beam). In operation 1515, the electronic device 101 may determine the beam pair without applying filtering of the synchronization signal block based on the first receive beam. According to an embodiment, the electronic device 101 may access the network by using the determined beam pair. According to an embodiment, in operation 1535, the electronic device 101 may perform beam tracking by using a synchronization signal block determined after access to a network.

According to various embodiments, if the reception strength of at least one synchronization signal block received by using the first receive beam is equal to or greater than the specified threshold value, in operation 1520, the electronic device 101 may identify at least one synchronization signal block based at least in part on the reception strength. For example, the electronic device 101 may identify at least one synchronization signal block having a reception strength equal to or greater than the threshold value.

According to various embodiments, in operation 1525, the electronic device 101 may receive the at least one identified synchronization signal block by using each of the plurality of second receive beams. For example, the electronic device 101 may form a second receive beam by forming a directional beam by using a plurality of antenna elements of an antenna array.

According to various embodiments, in operation 1530, the electronic device 101 may determine one synchronization signal block among the at least one identified synchronization signal block based at least in part on the reception strength of at least one synchronization signal block received using each of the plurality of second receive beams. According to an embodiment, in operation 1535, the electronic device 101 may perform beam tracking by using the determined synchronization signal block.

In operations 1520 to 1530, the electronic device may determine a beam pair by measuring some of the plurality of synchronization signal blocks using each of the plurality of second receive beams. For example, as described above with reference to FIG. 14, the electronic device 101 may reduce power consumption by measuring some of the synchronization signal blocks. According to an embodiment, the electronic device 101 may access the network by using the determined beam pair.

According to various embodiments, in operation 1540, the electronic device 101 may determine whether a specified condition is satisfied. For example, a specified condition may be satisfied when a block error rate (e.g., BLER) is less than a specified value. For another example, the specified condition may include a case in which a specified timer triggered after network access does not expire. If the specified condition is not satisfied, the electronic device 101 may perform operation 1505 again to perform a beam pair determination procedure. If the specified condition is satisfied, the electronic device 101 may monitor the state of the predetermined beam pair by performing beam tracking at a specified period.

Figure 16:
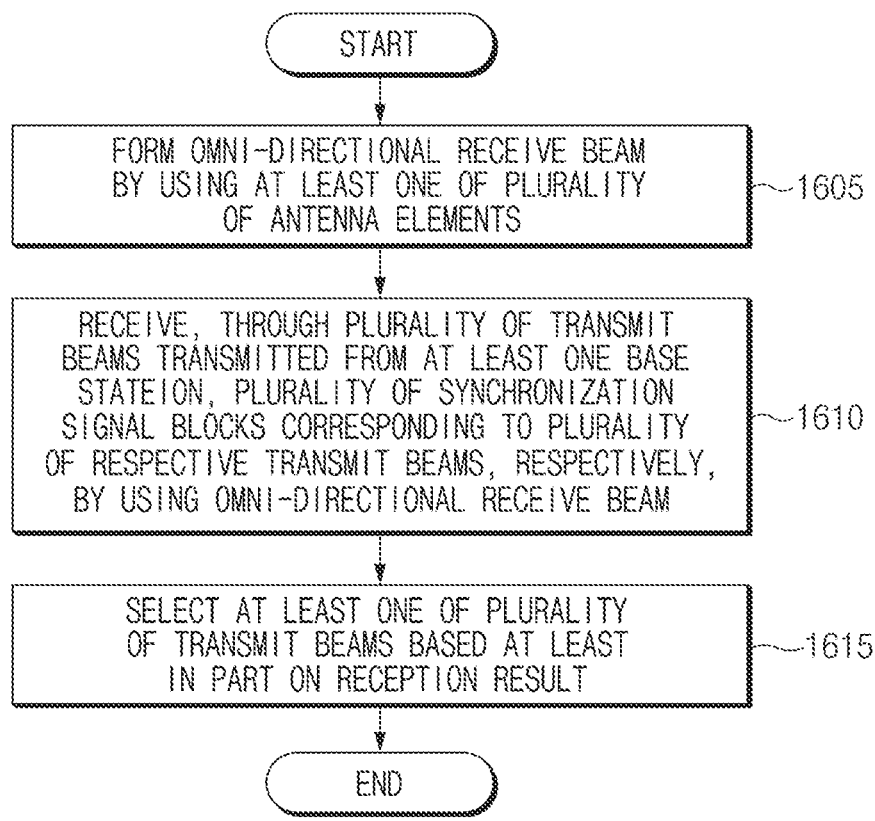
FIG. 16 shows a flowchart of a method for receiving a synchronization signal block according to various embodiments.

FIG. 16 shows a flowchart of a method for receiving a synchronization signal block according to various embodiments.

According to various embodiments, an electronic device may include a housing, at least one antenna array (e.g., the antenna array 330 of FIG. 3) disposed in the housing or formed on a part of the housing and including a plurality of antenna elements (e.g., the antenna elements 332, 334, 336, and 338 of FIG. 3), a processor (e.g., the processor 120 of FIG. 1 and/or the communication module 190) electrically or operatively connected to the antenna array, and a memory (e.g., the memory 130 of FIG. 1) operatively connected to the at least one processor. For example, the memory may store instructions that, when executed, cause the processor to perform operations to be described below.

According to various embodiments, in operation 1605, a processor of the electronic device 101 (e.g., the processor 120 of FIG. 1 and/or the communication module 190) may form an omni-directional receive beam (e.g., a non-directional or non-beamformed receive beam) by using at least one of the plurality of antenna elements (e.g., the plurality of antenna elements 332, 334, 336, or 338 of FIG. 3).

According to various embodiments, in operation 1610, the processor may receive, through a plurality of transmit beams (e.g., transmit beams 535-1 to 535-5 of FIG. 5) transmitted from at least one base station (e.g., the base station 520 of FIG. 5), a plurality of synchronization signal blocks (e.g., SSB1 to SSBL of FIG. 8) corresponding to the plurality of transmit beams, respectively, by using an omni-directional receive beam.

According to various embodiments, in operation 1615, the processor may select at least one transmit beam among the plurality of transmit beams based at least in part on the reception result.

According to various embodiments, the processor may receive at least one transmit beam selected by using a plurality of directional receive beams, and select one transmit beam based at least in part on the reception result. For example, the processor may identify time information related to the selected transmit beam from at least one SSB corresponding to the selected transmit beam, and based at least in part on the time information and the direction of the selected transmit beam, form at least one directional receive beam (RX beam). According to an embodiment, when a plurality of SSBs are received, the processor may measure the signal strength of the plurality of transmit beams and select at least one among the plurality of transmit beams based at least in part on the measurement result. For example, the processor may select at least one transmit beam by comparing signal strengths of the transmit beams with a selected threshold value. According to an embodiment, the processor may determine a beam pair including one transmit beam and one receive beam.

According to an embodiment, the processor may be configured not to form a directional receive beam in a direction other than the direction of the selected transmit beam.

According to various embodiments, an electronic device (e.g., the electronic device 101 of FIG. 1) may include a memory (e.g., the memory 130 of FIG. 1), an antenna array (e.g., the antenna array 330 of FIG. 3) including a plurality of conductive plates (e.g., the conductive plates 332, 334, 336, and 338 of FIG. 3), and a processor (e.g., the processor 120 of FIG. 1 and/or the communication module 190) operatively connected to the memory and the antenna array. According to an embodiment, the processor may be configured to receive a plurality of synchronization signal blocks (e.g., SSB1, SSB2, . . . , SSBL of FIG. 8) corresponding to a plurality of transmit beams (e.g., the transmit beams 535-1, 535-2, 535-3, 535-4, and/or 535-5) from a base station (e.g., the base station 520 of FIG. 5) by using at least one first receive beam (e.g., the first receive beam 899 of FIG. 8, the first-first receive beam 1091, the first-second receive beam 1092, and/or the first-third receive beam 1093 of FIG. 10) formed using one of the plurality of conductive plates, identify at least one of the plurality of synchronization signal blocks received by using the first receive beam based at least in part on reception strengths of the plurality of synchronization signal blocks, receive the at least one identified synchronization signal block by using each of a plurality of second receive beams (e.g., the receive beams 545-1, 545-2, and 545-3 of FIG. 5) formed using the plurality of conductive plates, and determine one synchronization signal block among the at least one identified synchronization signal block based at least in part on a reception strength of at least one synchronization signal block received using each of the plurality of second receive beams.

According to an embodiment, the processor may be configured to transmit, to the base station, information (e.g., SSB index) on the determined one synchronization signal block.

According to an embodiment, the processor may be configured to determine at least one synchronization signal block of which the reception strength is equal to or greater than a specified threshold value among the plurality of synchronization signal blocks received by using the first receive beam, as the at least one synchronization signal block.

According to an embodiment, the processor may be configured to, if a reception strength of each of the plurality of synchronization signal blocks received by using the first receive beam is less than the specified threshold value, receive the plurality of synchronization signal blocks by using each of the plurality of second receive beams, and determine one of the plurality of synchronization signal blocks based on the reception strength of each of the plurality of received synchronization signal blocks.

According to an embodiment, the processor may be configured to receive the at least one identified synchronization signal block by using each of the plurality of second receive beams, based at least in part on a receive timing of the at least one identified synchronization signal block.

According to an embodiment, the processor may be configured to change a state of the processor to a first state or a second state based at least in part on the receive timing, while the at least one identified synchronization signal block is being received by using each of the plurality of second receive beams. For example, the processor may have higher power consumption in the first state than in the second state.

According to an embodiment, the processor may be configured to transition from the second state to the first state just during a time interval corresponding to the receive timing of the at least one identified synchronization signal block, while the at least one identified synchronization signal block is being received by using each of the plurality of second receive beams.

According to an embodiment, the processor may be configured to, after access to the base station, receive the plurality of synchronization signal blocks by using the first receive beam when a specified time elapses after the access to the base station, or when an error rate of communication with the base station is equal to or greater than a specified value.

According to various embodiments, a method for receiving a synchronization signal of an electronic device may include receiving a plurality of synchronization signal blocks corresponding to a plurality of transmit beams from a base station by using a first receive beam formed using one of a plurality of conductive plates of an antenna array of the electronic device, identifying at least one of the plurality of synchronization signal blocks received by using the first receive beam based at least on reception strengths of the plurality of synchronization signal blocks, receiving the at least one identified synchronization signal block by using each of a plurality of second receive beams formed using the plurality of conductive plates, and determining one synchronization signal block among the at least one identified synchronization signal block based at least on a reception strength of at least one synchronization signal block received using each of the plurality of second receive beams.

According to an embodiment, the method may include transmitting, to the base station, information on the determined one synchronization signal block.

According to an embodiment, the identifying of at least one of the plurality of synchronization signal blocks may include determining at least one synchronization signal block of which the reception strength is equal to or greater than a specified threshold value among the plurality of synchronization signal blocks received by using the first receive beam, as the at least one synchronization signal block.

According to an embodiment, the method may further include receiving the plurality of synchronization signal blocks by using each of the plurality of second receive beams if the reception strength of the plurality of synchronization signal blocks received by using the first receive beams is less than a specified threshold value, and determining one of the plurality of synchronization signal blocks based on the reception strength of each of the plurality of received synchronization signal blocks.

According an embodiment, the receiving of the at least one identified synchronization signal block may include receiving the at least one identified synchronization signal block by using each of the plurality of second receive beams based at least in part on a receive timing of the at least one identified synchronization signal block.

According to an embodiment, the method may further include changing a state of the processor of the electronic device to a first state or a second state based at least in part on the receive timing, while the at least one identified synchronization signal block is being received by using each of the plurality of second receive beams. For example, the processor may have higher power consumption in the first state than in the second state.

According to an embodiment, the changing of the state of the processor of the electronic device to the first state or the second state may include causing the processor to transition from the second state to the first state just during a time interval corresponding to the receive timing of the at least one identified synchronization signal block, while the at least one identified synchronization signal block is being received by using each of the plurality of second receive beams.

The invention claimed is:

1. An electronic device comprising:
    a memory;
    an antenna array including a plurality of conductive plates; and
    a processor operatively connected to the memory and the antenna array,
    wherein the processor is configured to:
        receive a plurality of synchronization signal blocks corresponding to a plurality of transmit beams from a base station by using at least one first receive beam formed using one of the plurality of conductive plates;
        identify at least one of the plurality of synchronization signal blocks received by using the first receive beam based at least in part on reception strengths of the plurality of synchronization signal blocks;
        receive the at least one identified synchronization signal block by using each of a plurality of second receive beams formed using the plurality of conductive plates; and
        determine one synchronization signal block among the at least one identified synchronization signal block based at least in part on a reception strength of at least one synchronization signal block received by using each of the plurality of second receive beams.

2. The electronic device of claim 1, wherein the processor is configured to transmit, to the base station, information on the determined one synchronization signal block.

3. The electronic device of claim 1, wherein the processor is configured to determine at least one synchronization signal block of which the reception strength is equal to or greater than a specified threshold value among the plurality of synchronization signal blocks received by using the first receive beam, as the at least one synchronization signal block.

4. The electronic device of claim 3, wherein the processor is configured to, if a reception strength of each of the plurality of synchronization signal blocks received by using the first receive beam is less than the specified threshold value:
    receive the plurality of synchronization signal blocks by using each of the plurality of second receive beams; and
    determine one of the plurality of synchronization signal blocks based on the reception strength of each of the plurality of received synchronization signal blocks.

5. The electronic device of claim 1, wherein the processor is configured to receive the at least one identified synchronization signal block by using each of the plurality of second receive beams, based at least in part on a receive timing of the at least one identified synchronization signal block.

6. The electronic device of claim 5, wherein the processor is configured to change a state of the processor to a first state or a second state based at least in part on the receive timing, while the at least one identified synchronization signal block is being received by using each of the plurality of second receive beams, and the processor has higher power consumption in the first state than in the second state.

7. The electronic device of claim 6, wherein the processor is configured to transition from the second state to the first state just during a time interval corresponding to the receive timing of the at least one identified synchronization signal block, while the at least one identified synchronization signal block is being received by using each of the plurality of second receive beams.

8. The electronic device of claim 1, wherein the processor is configured to, after access to the base station, receive the plurality of synchronization signal blocks by using the first receive beam when a specified time elapses after the access to the base station, or when an error rate of communication with the base station is equal to or greater than a specified value.

9. A method for receiving a synchronization signal of an electronic device, comprising:

receiving a plurality of synchronization signal blocks corresponding to a plurality of transmit beams from a base station by using a first receive beam formed using one of a plurality of conductive plates of an antenna array of the electronic device;

identifying at least one of the plurality of synchronization signal blocks received by using the first receive beam based at least on reception strengths of the plurality of synchronization signal blocks;

receiving the at least one identified synchronization signal block by using each of a plurality of second receive beams formed using the plurality of conductive plates; and determining one synchronization signal block among the at least one identified synchronization signal block based at least on a reception strength of at least one synchronization signal block received using each of the plurality of second receive beams.

10. The method of claim 9, further comprising transmitting, to the base station, information on the determined one synchronization signal block.

11. The method of claim 9, wherein the identifying of at least one of the plurality of synchronization signal blocks includes determining at least one synchronization signal block of which the reception strength is equal to or greater than a specified threshold value among the plurality of synchronization signal blocks received by using the first receive beam, as the at least one synchronization signal block.

12. The method of claim 9, further comprising:

receiving the plurality of synchronization signal blocks by using each of the plurality of second receive beams if the reception strengths of the plurality of synchronization signal blocks received by using the first receive beams is less than a specified threshold value; and determining one of the plurality of synchronization signal blocks based on the reception strength of each of the plurality of received synchronization signal blocks.

13. The method of claim 9, wherein the receiving of the at least one identified synchronization signal block includes receiving the at least one identified synchronization signal block by using each of the plurality of second receive beams based at least in part on a receive timing of the at least one identified synchronization signal block.

14. The method of claim 13, further comprising changing a state of the processor of the electronic device to a first state or a second state based at least in part on the receive timing, while the at least one identified synchronization signal block is being received by using each of the plurality of second receive beams, wherein the processor has higher power consumption in the first state than in the second state.

15. The method of claim 14, wherein the changing of the state of the processor of the electronic device to the first state or the second state includes causing the processor to transition from the second state to the first state just during a time interval corresponding to the receive timing of the at least one identified synchronization signal block, while the at least one identified synchronization signal block is being received by using each of the plurality of second receive beams.

* * * * *